United States Patent
Zhou et al.

(10) Patent No.: US 9,835,862 B1
(45) Date of Patent: Dec. 5, 2017

(54) GRAPHIC INTERFACE FOR REAL-TIME VISION ENHANCEMENT

(71) Applicant: Google Inc., Mountain View, CA (US)

(72) Inventors: Changyin Zhou, Mountain View, CA (US); Roman Lewkow, San Jose, CA (US); Marc Stewart Levoy, Stanford, CA (US); Jiawen Chen, San Francisco, CA (US)

(73) Assignee: Google LLC, Mountain View, CA (US)

(*) Notice: Subject to any disclaimer, the term of this patent is extended or adjusted under 35 U.S.C. 154(b) by 151 days.

(21) Appl. No.: 14/278,608

(22) Filed: May 15, 2014

(51) Int. Cl.
*G06F 3/045* (2006.01)
*G02B 27/01* (2006.01)
*G06F 3/041* (2006.01)
*G06F 3/00* (2006.01)

(52) U.S. Cl.
CPC .......... *G02B 27/017* (2013.01); *G06F 3/005* (2013.01); *G06F 3/041* (2013.01); *G02B 2027/0178* (2013.01)

(58) Field of Classification Search
CPC ............... G11B 27/032; G02B 27/017; G02B 2027/0178; G06F 3/041; G06F 3/005
USPC .................................................. 345/173–174
See application file for complete search history.

(56) References Cited

U.S. PATENT DOCUMENTS

| | | | |
|---|---|---|---|
| 8,625,013 B2 | 1/2014 | Jannard et al. | |
| 8,648,873 B1 | 2/2014 | Tantalo et al. | |
| 2002/0071047 A1 | 6/2002 | Strong et al. | |
| 2005/0053356 A1* | 3/2005 | Mate | G11B 27/032 386/280 |
| 2007/0024946 A1* | 2/2007 | Panasyuk | A61B 5/0059 359/253 |
| 2007/0035561 A1* | 2/2007 | Bachelder | G06T 19/003 345/633 |
| 2007/0074115 A1* | 3/2007 | Patten | G11B 27/032 715/716 |
| 2008/0170119 A1 | 7/2008 | McCann | |
| 2009/0085934 A1* | 4/2009 | Baier | G06Q 10/06 345/660 |
| 2012/0105703 A1* | 5/2012 | Lee | G06T 11/60 348/333.11 |

(Continued)

OTHER PUBLICATIONS

Lorenz Potthast, The Decelerator: A Slow Motion Perception Helmet, DesignBoom, http://www.designboom.com/technology/the-decelerator-helmetl, Nov. 14, 2012.

*Primary Examiner* — Kwin Xie
(74) *Attorney, Agent, or Firm* — McDonnell Boehnen Hulbert & Berghoff LLP

(57) ABSTRACT

Imaging systems can often gather higher quality information about a field of view than the unaided human eye. For example, telescopes may magnify very distant objects, microscopes may magnify very small objects, and high frame-rate cameras may capture fast motion. The present disclosure includes devices and methods that provide real-time vision enhancement without the delay of replaying from storage media. The disclosed devices and methods may include a live view user interface with two or more interactive features or effects that may be controllable in real-time. Specifically, the disclosed devices and methods may include a live view display and image and other information enhancements, which utilize in-line computation and constant control.

13 Claims, 18 Drawing Sheets

(56) References Cited

U.S. PATENT DOCUMENTS

| | | | |
|---|---|---|---|
| 2012/0142415 A1* | 6/2012 | Lindsay | H04N 5/2224 463/33 |
| 2012/0229596 A1 | 9/2012 | Rose et al. | |
| 2013/0155105 A1* | 6/2013 | Boldyrev | A63F 13/10 345/633 |
| 2013/0230259 A1* | 9/2013 | Intwala | G06T 5/20 382/255 |
| 2013/0235169 A1* | 9/2013 | Kato | G02B 27/01 348/53 |
| 2014/0285519 A1* | 9/2014 | Uusitalo | G06T 19/006 345/633 |

* cited by examiner

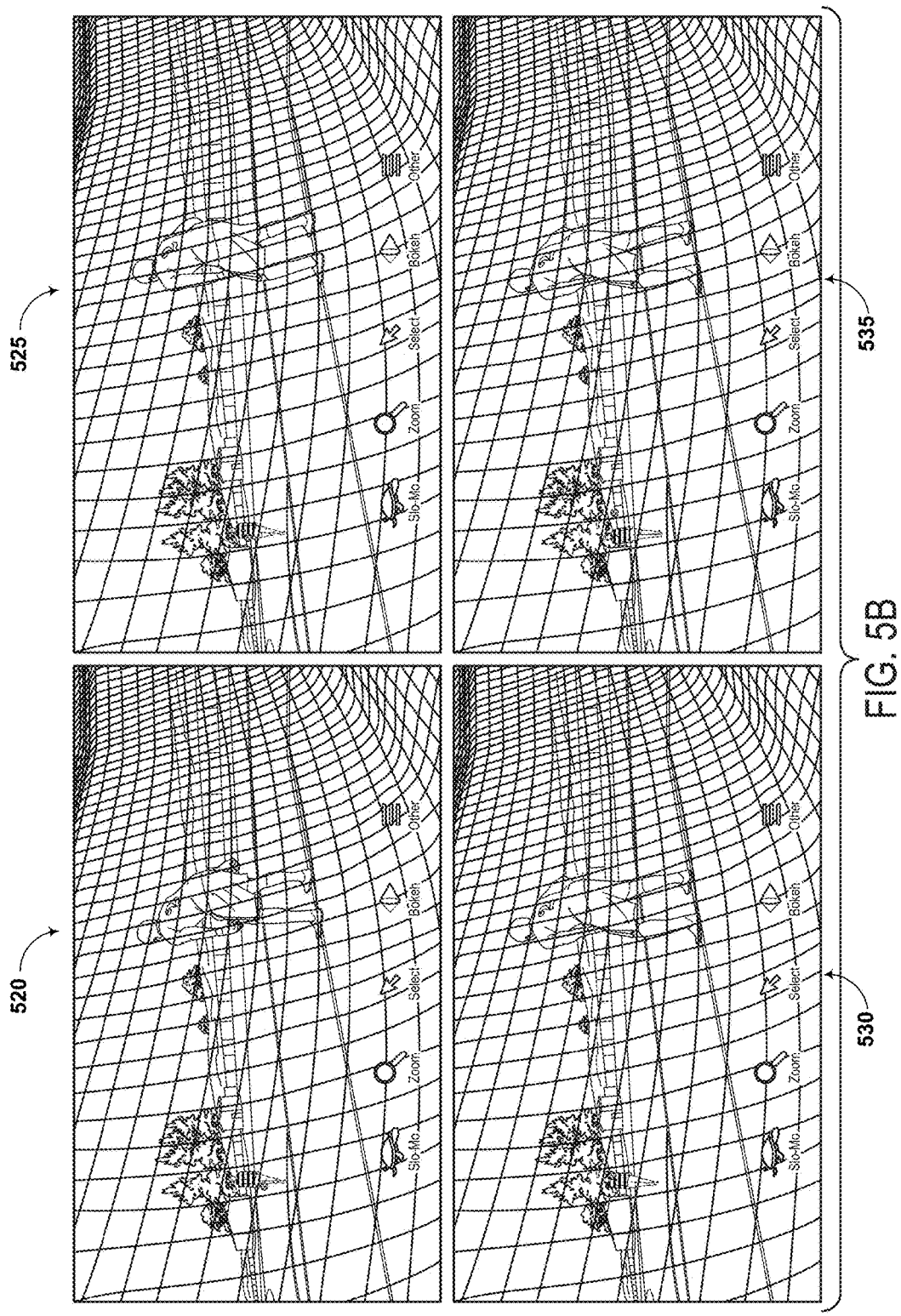

GRAPHIC INTERFACE FOR REAL-TIME VISION ENHANCEMENT

BACKGROUND

Unless otherwise indicated herein, the materials described in this section are not prior art to the claims in this application and are not admitted to be prior art by inclusion in this section.

Cameras and their associated optics may capture information from scenes that is often better than what unaided human eyes can detect. For example, telescopes can magnify very distant objects, microscopes can magnify very small objects, high frame-rate cameras can capture much faster motion, and so on. However, most examples are designed to store images or video files for replay at a later time. Furthermore, many of the examples are not portable and many of them are designed for specific scientific tasks.

The present disclosure provides systems and methods for a real-time, live view display with image and other information enhancements using in-line computation and constant control. In particular, the disclosure may include a live view user interface with two or more interactive features or effects, which are executable and controllable in real-time. In other words, the disclosed invention permits real-time vision enhancement without the delay of replay from storage media.

SUMMARY

In a first aspect, a system is provided. The system includes a display, a touch-based control interface, and a control system. The display is configured to display a live view representation of a field of view based on image data from one or more image-capture devices. The control system is configured to generate the live view representation of the field of view based on image data from one or more image-capture devices. The control system is also configured to receive a control input for two or more effects via the touch-based control interface. Additionally, the control system is configured to, for each of the two or more effects, respond to receipt of the control input for the effect via the touch-based control interface by applying the effect to the live view representation in real time.

In a second aspect, a method is provided. The method includes providing a live view representation of a field of view to a display. The live view representation is based on image data from one or more image-capture devices. The method also includes receiving a control input for two or more effects via a touch-based control interface. Additionally, the method includes, for each of the two or more effects, responding to receipt of the control input for the effect via the touch-based control interface by applying the effect to the live view representation in real time.

In a third aspect, a non-transitory computer readable medium is provided. The non-transitory computer readable medium includes instructions executable by a computing device to cause the computing device to perform functions, the functions including causing a live view representation of a field of view to be provided to a display. The live view representation is based on image data from one or more image-capture devices. The functions further include receiving a control input for two or more effects via a touch-based control interface. The functions yet further include, for each of the two or more effects, responding to receipt of the control input for the effect via the touch-based control interface by causing the effect to be applied to the live view representation in real time.

These as well as other aspects, advantages, and alternatives, will become apparent to those of ordinary skill in the art by reading the following detailed description, with reference where appropriate to the accompanying drawings.

BRIEF DESCRIPTION OF THE DRAWINGS

FIG. 5B depicts four scenes, according to an illustrative embodiment.

DETAILED DESCRIPTION

Figure 1A:
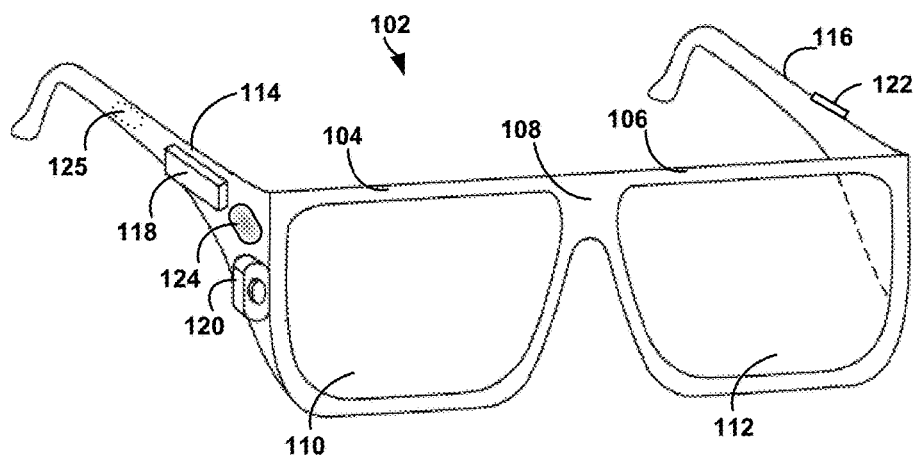
FIG. 1A is a perspective view of an example system, according to an illustrative embodiment.

Example methods and systems are described herein. It should be understood that the words "example," "exemplary," and "illustrative" are used herein to mean "serving as an example, instance, or illustration." Any embodiment or feature described herein as being an "example," being "exemplary," or being "illustrative" is not necessarily to be construed as preferred or advantageous over other embodiments or features. The example embodiments described herein are not meant to be limiting. It will be readily understood that the aspects of the present disclosure, as generally described herein, and illustrated in the figures, can be arranged, substituted, combined, separated, and designed in a wide variety of different configurations, all of which are explicitly contemplated herein.

I. Overview

Unless otherwise indicated herein, the materials described in this section are not prior art to the claims in this application and are not admitted to be prior art by inclusion in this section.

An imaging system may capture information about a scene and display a live view representation of the scene to a user in real time. In some imaging systems, the live view representation may include more information or different information than what the unaided human eye may be able to sense. Thus, the live view representation may provide enhanced vision to users.

In an example embodiment, the system may include a display, a touch-based control interface, and a control system. The display may be configured to provide, among other information, a live view representation to a user in real time. The live view representations may be based on image data from one or more image-capture devices.

The control system may be configured to generate the live view representation based on the image data from the one or more image-capture devices. For example, the control system may receive image data from a video camera. The control system may apply two or more effects to the video stream. The control system may also receive a control input, such as from the touch-based control interface. In response to receiving the control input, the application of the two or more effects may be initiated, adjusted, modified, or removed from the live view representation. The control input may alternatively or additionally be received from other types of control interfaces. For example, the system may include a voice-based interface or a gesture-based interface.

Upon receipt of the control input, two or more effects may be applied to the live view representation in real time. For example, a control input, such as from a user touching a touch-sensitive surface, may initiate two or more effects, which may be applied to the live view representation to varying degree based the control input. Furthermore, the control input may persist after the two or more effects are initially applied. In one embodiment, the control input may change based on, for example, a change in the input to the touch-sensitive surface. In response, the degree or other characteristics of the two or more effects may be adjusted.

Furthermore, a user may be able to control the impact of two or more effects on the live-view representation with respect to one another. For example, a user may interact with a two-dimensional touch-sensitive surface to apply a first effect and a second effect to the live-view representation. The degree or extent of the respective effects may be based on the user's finger position along perpendicular axes on the touch-sensitive surface. In other words, in response to changing the user's finger position along an axis, the first effect may be changed. In response to changing the user's finger position along a perpendicular axis, the second effect may be changed. Other means of modifying one effect with respect to another are contemplated herein.

The two or more effects may include, but are not limited to, a slow-motion effect, a speed-up effect, a bokeh effect, a high-dynamic range effect, and a hyperspectral effect. Other effects are possible.

In one embodiment, a user may be wearing a head-mountable device with an attached camera, touch-sensitive surface, and a display. The user may be attending a soccer game and a display of the head-mountable device may initially provide a live view representation via the display similar to what the user might normally see in his/her field of view. In addition to a "normal" live view representation, a user interface may be presented to the user. For example, a row of icons, buttons, text, and/or shapes could appear in a portion of the live view representation.

The user may initiate a first effect by, for example, pushing on the touch-sensitive surface in a location related to one of the user interface buttons. In response to the control input, the live view representation may appear to the view as a slowed-down representation of the real world. For example, a soccer ball flying through the air could appear to the user as though it were moving slower than normal. While the first effect is still initiated, the user may initiate a second effect. In other words, the user may touch the touch-sensitive surface in order to select a particular displayed object in the live view representation. The user may select the soccer ball, for example. In response to the second control input, a halo or highlight could be added to the live view representation of the ball. Other combinations of effects are possible.

It should be understood that the above embodiments, and other embodiments described herein, are provided for explanatory purposes, and are not intended to be limiting.

II. Illustrative Systems

The disclosure describes a touch-based system and user interface for controlling and presenting two or more real-time vision enhancement effects in one device. Specifically, the disclosed system may, in response to a touch-based control input, apply two or more effects to a live-view representation. For example, in response to a control input, a magnification and slow-motion effect may be applied to a live-view representation in real time.

Additionally, a user interface may provide access to multiple effects from a single live view interface. The user may switch between effects or combine effects in real time.

Systems and devices in which example embodiments may be implemented will now be described in greater detail. In general, an example system may be implemented in or may take the form of a wearable computer (also referred to as a wearable computing device). In an example embodiment, a wearable computer takes the form of or includes a head-mountable device (HMD).

An example system may also be implemented in or take the form of other devices, such as a mobile phone, among other possibilities. Further, an example system may take the form of non-transitory computer readable medium, which has program instructions stored thereon that are executable by at a processor to provide the functionality described herein. An example system may also take the form of a device such as a wearable computer or mobile phone, or a subsystem of such a device, which includes such a non-transitory computer readable medium having such program instructions stored thereon.

An HMD may generally be any display device that is capable of being worn on the head and places a display in front of one or both eyes of the wearer. An HMD may take various forms such as a helmet or eyeglasses. As such, references to "eyeglasses" or a "glasses-style" HMD should be understood to refer to an HMD that has a glasses-like frame so that it can be worn on the head. Further, example embodiments may be implemented by or in association with an HMD with a single display or with two displays, which may be referred to as a "monocular" HMD or a "binocular" HMD, respectively.

FIG. 1A illustrates a wearable computing system according to an example embodiment. In FIG. 1A, the wearable computing system takes the form of a head-mountable device (HMD) 102 (which may also be referred to as a head-mounted display). It should be understood, however, that example systems and devices may take the form of or be implemented within or in association with other types of devices, without departing from the scope of the invention. As illustrated in FIG. 1A, the HMD 102 includes frame elements including lens-frames 104, 106 and a center frame support 108, lens elements 110, 112, and extending side-arms 114, 116. The center frame support 108 and the extending side-arms 114, 116 are configured to secure the HMD 102 to a user's face via a user's nose and ears, respectively.

Each of the frame elements 104, 106, and 108 and the extending side-arms 114, 116 may be formed of a solid structure of plastic and/or metal, or may be formed of a hollow structure of similar material so as to allow wiring and component interconnects to be internally routed through the HMD 102. Other materials may be possible as well.

One or more of each of the lens elements 110, 112 may be formed of any material that can suitably display a projected image or graphic. Each of the lens elements 110, 112 may also be sufficiently transparent to allow a user to see through the lens element. Combining these two features of the lens elements may facilitate an augmented reality or heads-up display where the projected image or graphic is superimposed over a real-world view as perceived by the user through the lens elements.

The extending side-arms 114, 116 may each be projections that extend away from the lens-frames 104, 106, respectively, and may be positioned behind a user's ears to secure the HMD 102 to the user. The extending side-arms 114, 116 may further secure the HMD 102 to the user by extending around a rear portion of the user's head. Additionally or alternatively, for example, the HMD 102 may connect to or be affixed within a head-mounted helmet structure. Other configurations for an HMD are also possible.

The HMD 102 may also include an on-board computing system 118, an image capture device 120, a sensor 122, and a finger-operable touch pad 124 or a touch-based control interface. The on-board computing system 118 is shown to be positioned on the extending side-arm 114 of the HMD 102; however, the on-board computing system 118 may be provided on other parts of the HMD 102 or may be positioned remote from the HMD 102 (e.g., the on-board computing system 118 could be wire- or wirelessly-connected to the HMD 102). The on-board computing system 118 may include a processor and memory, for example. The on-board computing system 118 may be configured to receive and analyze data from the image capture device 120 and the finger-operable touch pad 124 (and possibly from other sensory devices, user interfaces, or both) and generate images for output by the lens elements 110 and 112.

The image capture device 120 may be, for example, a camera that is configured to capture still images and/or to capture video. In the illustrated configuration, image capture device 120 is positioned on the extending side-arm 114 of the HMD 102; however, the image capture device 120 may be provided on other parts of the HMD 102. The image capture device 120 may be configured to capture images at various resolutions or at different frame rates. Many image capture devices with a small form-factor, such as the cameras used in mobile phones or webcams, for example, may be incorporated into an example of the HMD 102.

Further, although FIG. 1A illustrates one image capture device 120, more image capture device may be used, and each may be configured to capture the same view, or to capture different views. For example, the image capture device 120 may be forward facing to capture at least a portion of the real-world view perceived by the user. This forward facing image captured by the image capture device 120 may then be used to generate an augmented reality where computer generated images appear to interact with or overlay the real-world view perceived by the user.

The sensor 122 is shown on the extending side-arm 116 of the HMD 102; however, the sensor 122 may be positioned on other parts of the HMD 102. For illustrative purposes, only one sensor 122 is shown. However, in an example embodiment, the HMD 102 may include multiple sensors. For example, an HMD 102 may include sensors 102 such as one or more gyroscopes, one or more accelerometers, one or more magnetometers, one or more light sensors, one or more infrared sensors, and/or one or more microphones. Other sensing devices may be included in addition or in the alternative to the sensors that are specifically identified herein.

The finger-operable touch pad 124 or touch-based control interface is shown on the extending side-arm 114 of the HMD 102. However, the finger-operable touch pad 124 may be positioned on other parts of the HMD 102. Also, more than one finger-operable touch pad may be present on the HMD 102. The finger-operable touch pad 124 may be used by a user to input commands. The finger-operable touch pad 124 may sense at least one of a pressure, position and/or a movement of one or more fingers via capacitive sensing, resistance sensing, or a surface acoustic wave process, among other possibilities. The finger-operable touch pad 124 may be capable of sensing movement of one or more fingers simultaneously, in addition to sensing movement in a direction parallel or planar to the pad surface, in a direction normal to the pad surface, or both, and may also be capable of sensing a level of pressure applied to the touch pad surface. In some embodiments, the finger-operable touch pad 124 may be formed of one or more translucent or transparent insulating layers and one or more translucent or transparent conducting layers. Edges of the finger-operable touch pad 124 may be formed to have a raised, indented, or roughened surface, so as to provide tactile feedback to a user when the user's finger reaches the edge, or other area, of the finger-operable touch pad 124. If more than one finger-operable touch pad is present, each finger-operable touch pad may be operated independently, and may provide a different function.

In a further aspect, HMD 102 may be configured to receive user input in various ways, in addition or in the alternative to user input received via finger-operable touch pad 124. For example, on-board computing system 118 may implement a speech-to-text process and utilize a syntax that maps certain spoken commands to certain actions. In addition, HMD 102 may include one or more microphones via which a wearer's speech may be captured. Configured as such, HMD 102 may be operable to detect spoken commands and carry out various computing functions that correspond to the spoken commands.

As another example, HMD 102 may interpret certain head-movements as user input. For example, when HMD 102 is worn, HMD 102 may use one or more gyroscopes and/or one or more accelerometers to detect head movement. The HMD 102 may then interpret certain head-movements as being user input, such as nodding, or looking up, down, left, or right. An HMD 102 could also pan or scroll through graphics in a display according to movement. Other types of actions may also be mapped to head movement.

As yet another example, HMD 102 may interpret certain gestures (e.g., by a wearer's hand or hands) as user input. For example, HMD 102 may capture hand movements by analyzing image data from image capture device 120, and initiate actions that are defined as corresponding to certain hand movements.

As a further example, HMD 102 may interpret eye movement as user input. In particular, HMD 102 may include one or more inward-facing image capture devices and/or one or more other inward-facing sensors (not shown) sense a user's eye movements and/or positioning. As such, certain eye movements may be mapped to certain actions. For example, certain actions may be defined as corresponding to movement of the eye in a certain direction, a blink, and/or a wink, among other possibilities.

HMD 102 also includes a speaker 125 for generating audio output. In one example, the speaker could be in the form of a bone conduction speaker, also referred to as a bone conduction transducer (BCT). Speaker 125 may be, for example, a vibration transducer or an electroacoustic transducer that produces sound in response to an electrical audio signal input. The frame of HMD 102 may be designed such that when a user wears HMD 102, the speaker 125 contacts the wearer. Alternatively, speaker 125 may be embedded within the frame of HMD 102 and positioned such that, when the HMD 102 is worn, speaker 125 vibrates a portion of the frame that contacts the wearer. In either case, HMD 102 may be configured to send an audio signal to speaker 125, so that vibration of the speaker may be directly or indirectly transferred to the bone structure of the wearer. When the vibrations travel through the bone structure to the bones in the middle ear of the wearer, the wearer can interpret the vibrations provided by BCT 125 as sounds.

Various types of bone-conduction transducers (BCTs) may be implemented, depending upon the particular implementation. Generally, any component that is arranged to vibrate the HMD 102 may be incorporated as a vibration transducer. Yet further it should be understood that an HMD 102 may include a single speaker 125 or multiple speakers. In addition, the location(s) of speaker(s) on the HMD may vary, depending upon the implementation. For example, a speaker may be located proximate to a wearer's temple (as shown), behind the wearer's ear, proximate to the wearer's nose, and/or at any other location where the speaker 125 can vibrate the wearer's bone structure.

Figure 1B:
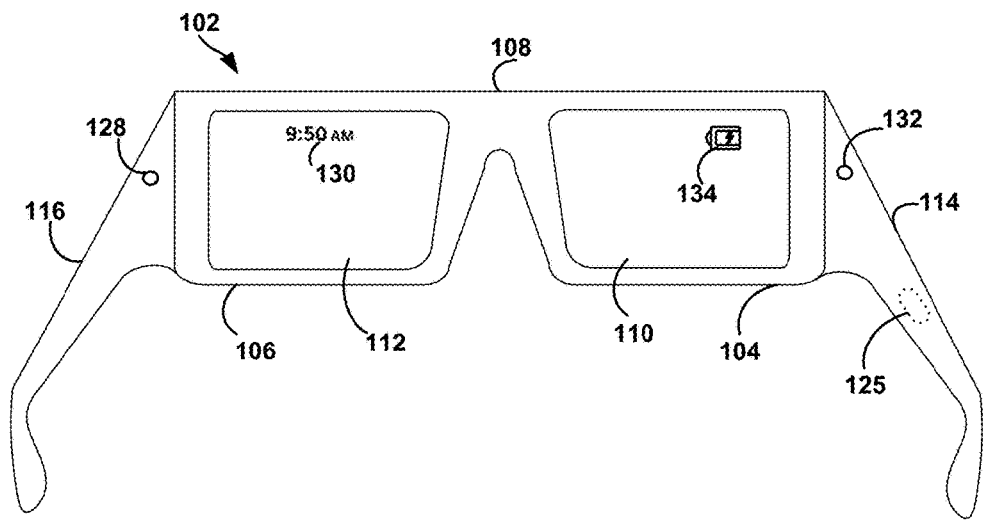
FIG. 1B is a perspective view of an example system, according to an illustrative embodiment.

FIG. 1B illustrates an alternate view of the wearable computing device illustrated in FIG. 1A. As shown in FIG. 1B, the lens elements 110, 112 may act as display elements. The HMD 102 may include a first projector 128 coupled to an inside surface of the extending side-arm 116 and configured to project a display 130 onto an inside surface of the lens element 112. Additionally or alternatively, a second projector 132 may be coupled to an inside surface of the extending side-arm 114 and configured to project a display 134 onto an inside surface of the lens element 110.

The lens elements 110, 112 may act as a combiner in a light projection system and may include a coating that reflects the light projected onto them from the projectors 128, 132. In some embodiments, a reflective coating may not be used (e.g., when the projectors 128, 132 are scanning laser devices).

In alternative embodiments, other types of display elements may also be used. For example, the lens elements 110, 112 themselves may include: a transparent or semi-transparent matrix display, such as an electroluminescent display or a liquid crystal display, one or more waveguides for delivering an image to the user's eyes, or other optical elements capable of delivering an in focus near-to-eye image to the user. A corresponding display driver may be disposed within the frame elements 104, 106 for driving such a matrix display. Alternatively or additionally, a laser or LED source and scanning system could be used to draw a raster display directly onto the retina of one or more of the user's eyes. Other possibilities exist as well.

The camera 120 may be a part of an imaging subsystem that may be configured to capture visual information from a field of view of camera 120. Camera 120 may be configured to capture images at a high frame rate, such as 240 Hz. Other frame rates are possible. Camera 120 may also be configured to capture images at a number of different frame rates. The visual information from camera 120 is processed by a processor (not shown) and may be presented on lens elements 110 and/or 112 in real time. The type and degree of effect application to the live view representation is controlled by users in real time, via the finger-operable touch pad 118.

Camera 120 may represent one, two, or more image capture devices configured to operate in various modes. For example, when capturing images for the slow motion effect, only one camera operating at high frame rate is required. Frames (captured at high frame rate) may be buffered in memory; and a program running on the system picks the right frame to display at a proper time and at a proper frame rate, according to user interaction via the finger-operable touch pad 118.

The one or more image-capture devices could include, but should not be limited to, cameras, sensors, imaging systems, or photosensors. The image-capture devices may be configured to capture images of a field of view. The image-capture devices may be configured to detect wavelengths of light at least partially within the visible light spectrum. Additionally or alternatively, the image-capture devices may be configured to capture images in the infrared spectrum, or at other wavelengths and/or within other wavelength bands.

When capturing image data for the low light effect, camera 120 may represent a RGB camera and a black and white camera running simultaneously. The black and white camera captures less noisy images with no color, and RGB camera captures color images with relatively more noise. Images from the black and white and RGB cameras may be combined into clean RGB images on-the-fly, which may be displayed instantly via the lens elements 110 and/or 112. The user may control the level of brightness and/or color saturation by simple user interactions in real time via the finger-operable touch pad 118.

User interaction in real time via the finger-operable touch pad 118 may alternatively or additionally control how many cameras and/or which camera(s) may operate.

Figure 1C:
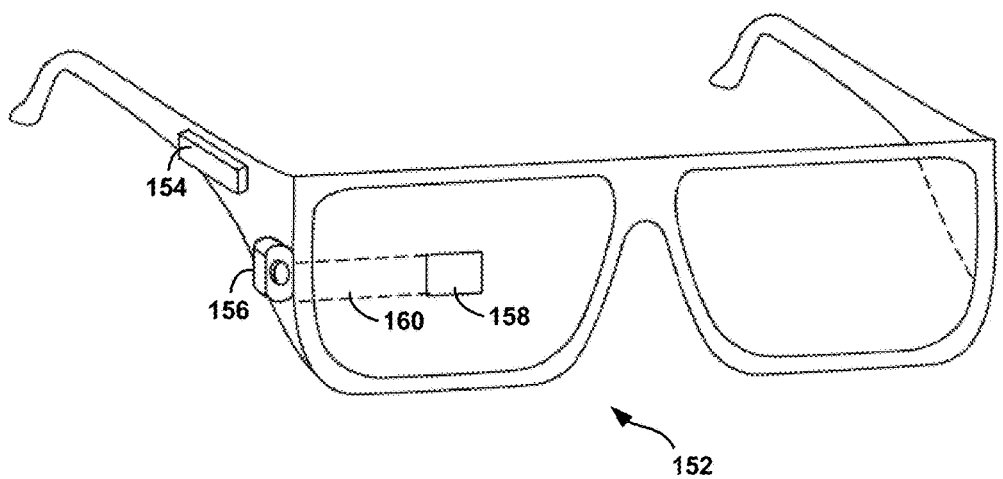
FIG. 1C is a perspective view of an example system, according to an illustrative embodiment.

FIG. 1C illustrates another wearable computing system according to an example embodiment, which takes the form of an HMD 152. The HMD 152 may include frame elements and side-arms such as those described with respect to FIGS. 1A and 1B. The HMD 152 may additionally include an on-board computing system 154 and an image capture device 156, such as those described with respect to FIGS. 1A and 1B. The image capture device 156 is shown mounted on a frame of the HMD 152. However, the image capture device 156 may be mounted at other positions as well, or may be embedded into or otherwise attached to the frame.

As shown in FIG. 1C, the HMD 152 may include a single display 158 which may be coupled to the device. The display 158 may be formed on one of the lens elements of the HMD 152, such as a lens element described with respect to FIGS. 1A and 1B, and may be configured to overlay computer-generated graphics in the user's view of the physical world. The display 158 is shown to be provided in a center of a lens of the HMD 152, however, the display 158 may be provided in other positions, such as for example towards either the upper or lower portions of the wearer's field of view. The display 158 is controllable via the computing system 154 that is coupled to the display 158 via an optical waveguide 160.

Figure 1D:
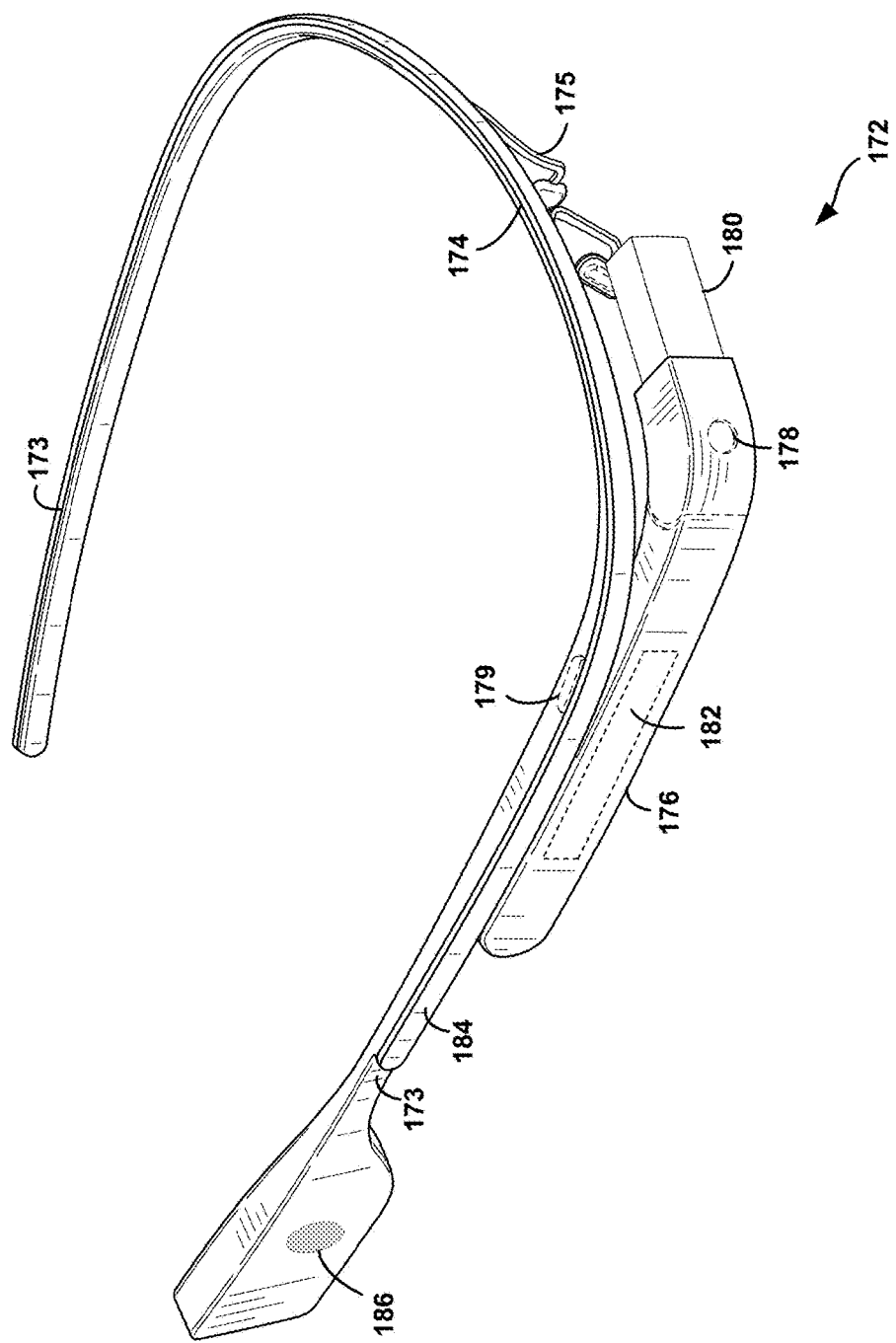
FIG. 1D is a perspective view of an example system, according to an illustrative embodiment.

FIG. 1D illustrates another wearable computing system according to an example embodiment, which takes the form of a monocular HMD 172. The HMD 172 may include side-arms 173, a center frame support 174, and a bridge portion with nosepiece 175. In the example shown in FIG. 1D, the center frame support 174 connects the side-arms 173. The HMD 172 does not include lens-frames containing lens elements. The HMD 172 may additionally include a component housing 176, which may include an on-board computing system (not shown), an image capture device 178, and a button 179 for operating the image capture device 178 (and/or usable for other purposes). Component housing 176 may also include other electrical components and/or may be electrically connected to electrical components at other locations within or on the HMD. HMD 172 also includes a BCT 186.

The HMD 172 may include a single display 180, which may be coupled to one of the side-arms 173 via the component housing 176. In an example embodiment, the display 180 may be a see-through display, which is made of glass and/or another transparent or translucent material, such that the wearer can see their environment through the display 180. Further, the component housing 176 may include the light sources (not shown) for the display 180 and/or optical elements (not shown) to direct light from the light sources to the display 180. As such, display 180 may include optical features that direct light that is generated by such light sources towards the wearer's eye, when HMD 172 is being worn.

The HMD 172 may also include a finger-operable touch pad 182, which may be similar or identical to the finger-operable touch pad described and shown in FIG. 1A-1C.

In a further aspect, HMD 172 may include a sliding feature 184, which may be used to adjust the length of the side-arms 173. Thus, sliding feature 184 may be used to adjust the fit of HMD 172. Further, an HMD may include other features that allow a wearer to adjust the fit of the HMD, without departing from the scope of the invention.

Figure 1E:
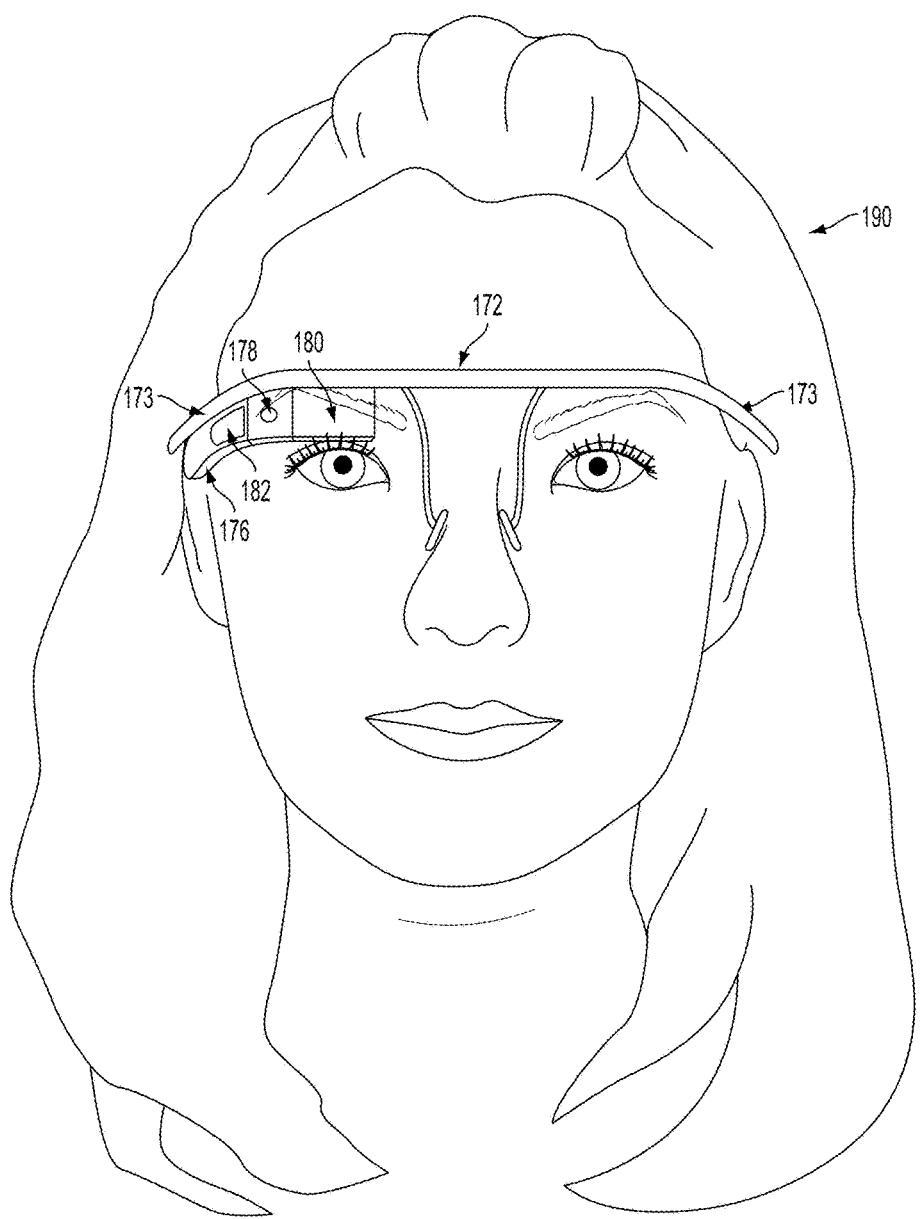
FIG. 1E is a perspective view of an example system, according to an illustrative embodiment.
Figure 1F:
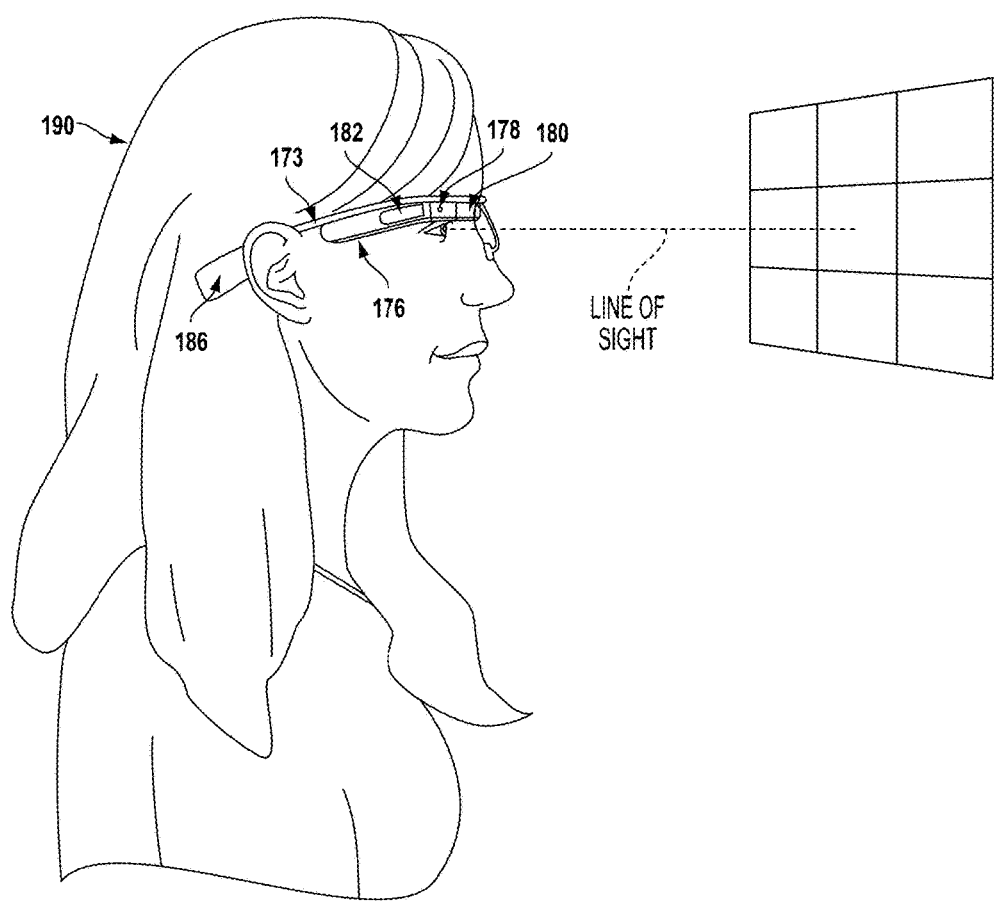
FIG. 1F is a perspective view of an example system, according to an illustrative embodiment.
Figure 1G:
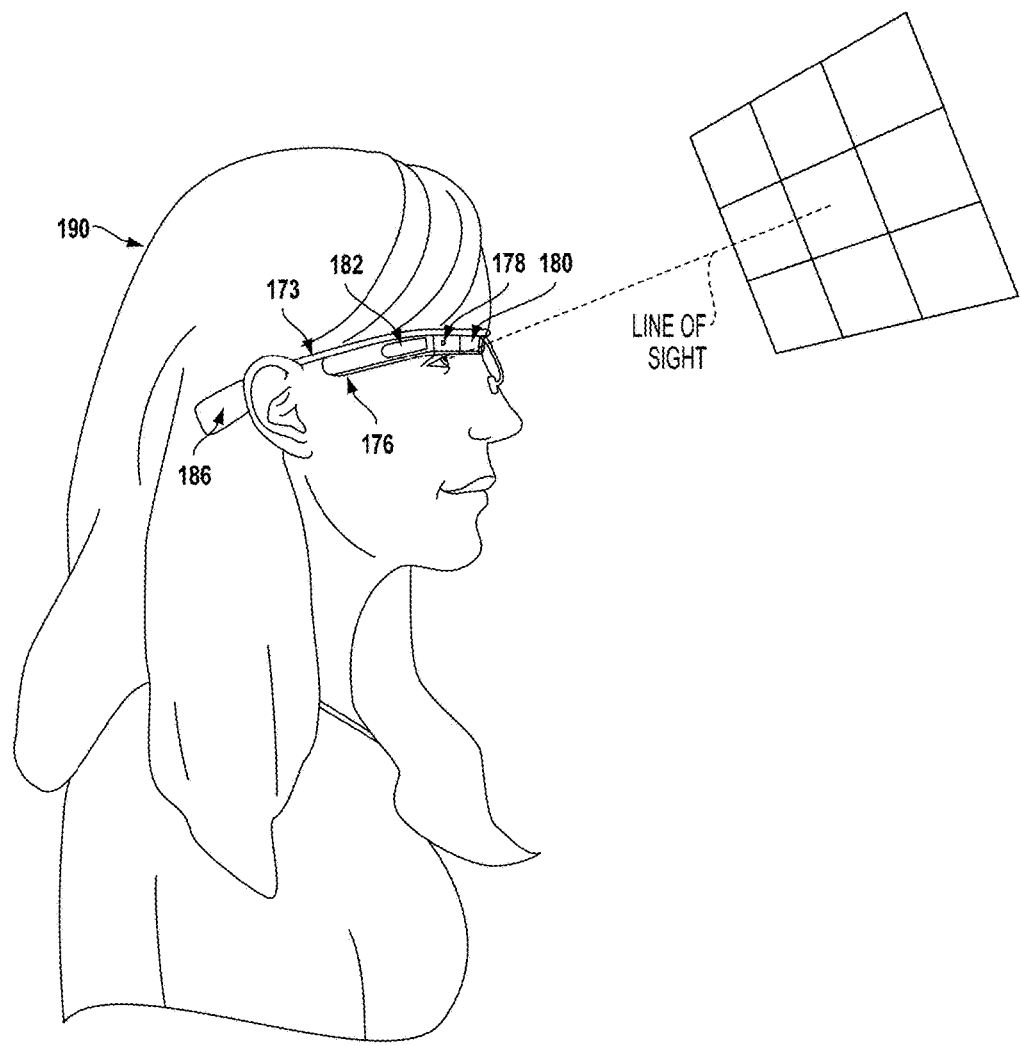
FIG. 1G is a perspective view of an example system, according to an illustrative embodiment.

FIGS. 1E to 1G are simplified illustrations of the HMD 172 shown in FIG. 1D, being worn by a wearer 190. As shown in FIG. 1F, BCT 186 is arranged such that when HMD 172 is worn, BCT 186 is located behind the wearer's ear. As such, BCT 186 is not visible from the perspective shown in FIG. 1E.

In the illustrated example, the display 180 may be arranged such that when HMD 172 is worn, display 180 is positioned in front of or proximate to a user's eye when the HMD 172 is worn by a user. For example, display 180 may be positioned below the center frame support and above the center of the wearer's eye, as shown in FIG. 1E. Further, in the illustrated configuration, display 180 may be offset from the center of the wearer's eye (e.g., so that the center of display 180 is positioned to the right and above of the center of the wearer's eye, from the wearer's perspective).

Configured as shown in FIGS. 1E to 1G, display 180 may be located in the periphery of the field of view of the wearer 190, when HMD 172 is worn. Thus, as shown by FIG. 1F, when the wearer 190 looks forward, the wearer 190 may see the display 180 with their peripheral vision. As a result, display 180 may be outside the central portion of the wearer's field of view when their eye is facing forward, as it commonly is for many day-to-day activities. Such positioning can facilitate unobstructed eye-to-eye conversations with others, as well as generally providing unobstructed viewing and perception of the world within the central portion of the wearer's field of view. Further, when the display 180 is located as shown, the wearer 190 may view the display 180 by, e.g., looking up with their eyes only (possibly without moving their head). This is illustrated as shown in FIG. 1G, where the wearer has moved their eyes to look up and align their line of sight with display 180. A wearer might also use the display by tilting their head down and aligning their eye with the display 180.

Figure 2A:
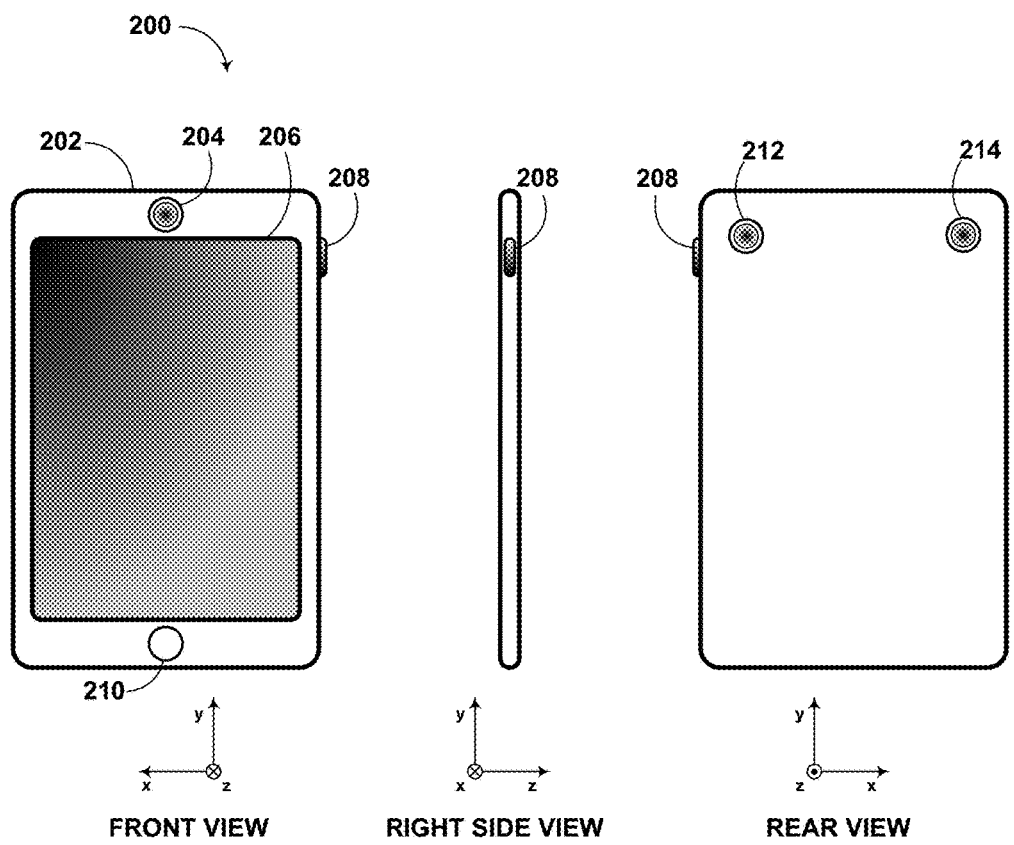
FIG. 2A is a perspective view of an example system, according to an illustrative embodiment.

In another embodiment, the system may take the form of other devices with a display or screen, such as mobile phones, tablets, PCs, etc. For example, as depicted in FIG. 2A, system 200 may configured like a smartphone or tablet. System 200 may include a body 202, a main button 210, a secondary button 208, a first camera 204, a second camera 212, and a display 206. The display 206 may optionally include a touch-sensitive surface.

For example, display 206 may provide a live view representation of a field of view based on image data from the first camera 204 and/or the second camera 212. A third camera 214 may be included. In some embodiments, multiple cameras may provide stereoscopic imaging, multispectral imaging, or other capabilities. A control system (e.g. a processor, not shown) may be configured to generate the live view representation and receive a control input corresponding to two or more effects. The control input may be entered via a touch-sensitive surface, the main button 210, and/or the secondary button 208. The control system may be further configured to respond to the control input by applying the effect to the live view representation in real time.

Figure 2B:
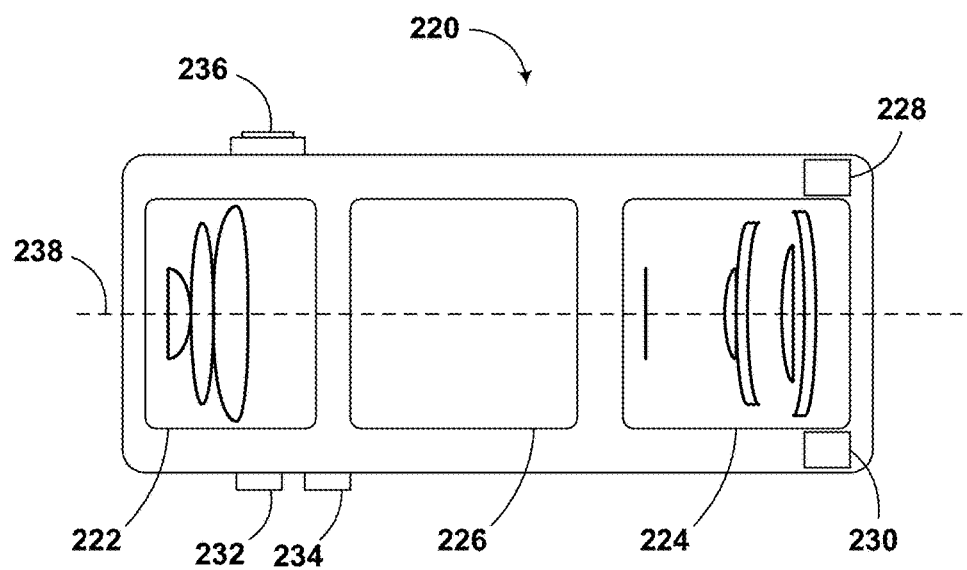
FIG. 2B is a schematic diagram of an example system, according to an illustrative embodiment.

FIG. 2B is a schematic block diagram of an illustrative system 220. System 220 may represent a monocular or binocular optical system viewable by a user. System 220 may include optical elements such as eyepiece 222, which may also represent an ocular lens. System 220 may also include an objective lens 224, and other elements 226. The other elements 226 may include, for example, processors and/or sensors. The system 220 may include components similar to a telephoto camera. The optical elements of system 220 may share a common optical axis 238. Alternatively, the optical elements need not share the same optical axis. System 220 may include an alternative light source or flash 228 and/or a wide field of view camera 230. System 220 may include a power button 232, a mode switcher 234, and a main control 236. In some embodiments, system 220 may be approximately 3 inches long and 1 inch in diameter. Other sizes and form factors of system 220 are possible.

Figure 3:
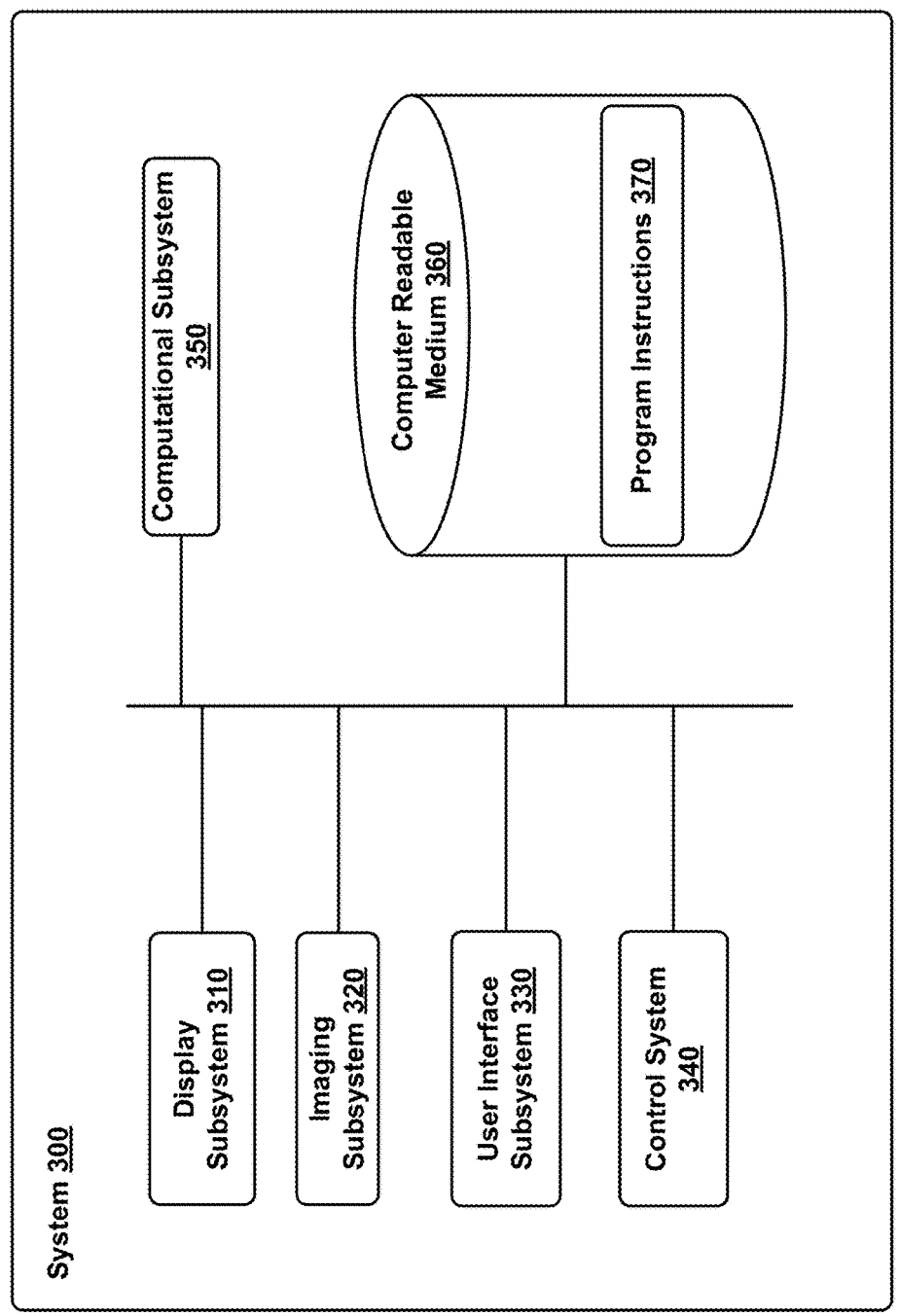
FIG. 3 is a functional block diagram of an example system, according to an illustrative embodiment.

FIG. 3 is a schematic block diagram of an illustrative system 300. The system 300 may include a display subsystem 310, an imaging subsystem 320, a user interface subsystem 330, a control system 340, a computational subsystem 350, a computer readable medium 360, and program instructions 370. System 300 may include more or fewer subsystems and/or components.

Image capture and real-time display may be performed computationally. Thus, various algorithms may be utilized to make transitions between the applied effects smooth. For example, when transitioning out of the slow-motion effect, the computational subsystem 350 and/or the display subsystem 310 may gradually reduce the rate of slow-down and/or speed up the live-view representation so as to appear smooth and/or more aesthetically pleasing to a user.

The user interface subsystem 330 may generally include a power button, a mode switch/button, and/or one or more controllers to allow users to turn on/off the device, switch modes, and control the level of vision enhancement. The user interface subsystem 330 may include a touch-sensitive surface (e.g. touch pad). A small display panel or a portion of the main user display may be provided to inform the user of the current state of the system and/or effect applied. The user interface subsystem 330 may include a touch pad that need not be part of the display. In other words, the user interface subsystem 330 may include a touch-sensitive surface distinct from the display.

The user interface subsystem 330 may be configured to accept a control input, such as a signal from a touch pad or other touch-sensitive surface. Many control inputs are possible, but single finger touch/swipe, double finger touch/swipe, multi-finger touch, and holds are all contemplated within the scope of the disclosure. Additionally, control inputs may include other ways of forming symbols, shapes, or letters via the touch-sensitive surface.

Although a touch-based control interface is disclosed within the context of user interface subsystem 330, other types of control interfaces are contemplated. For example, the user interface subsystem 330 may include a voice-based or a gesture-based control interface. Correspondingly, control inputs generated by user interface subsystem 330 may be triggered or initiated by voice or gesture commands from a user.

Upon receipt of the control input, the control system 340 may add, subtract, and/or modify two or more effects applied the live-view representation. Furthermore, the control system 340 may modify at least a first and second effect with respect to one another, which may affect the live-view representation. For example, a user may initiate a slow-motion effect. In such a scenario, in response to the user moving a finger upward on the touch-sensitive surface, the control system may modify the slow-motion effect with respect to a speed-up effect or another effect. Other combinations of effects are possible.

The computational subsystem 350 may include processors, memory, storage, and communication means (like WiFi and Bluetooth). The computational subsystem 350 may control the flow of information from the other subsystems; it may process images/video from the imaging subsystem 320. The computational subsystem 350 may (according to effect(s) applied and user interaction) process and fuse images from different sensors; and it feeds processed images/video to the display subsystem 310 instantly. In some implementations, at least some of the computational subsystem 350 may include cloud computing resources. In other words, the computational subsystem 350 may include processing capabilities that are remote from the display subsystem 310 and/or the imaging subsystem 320.

Figure 4:
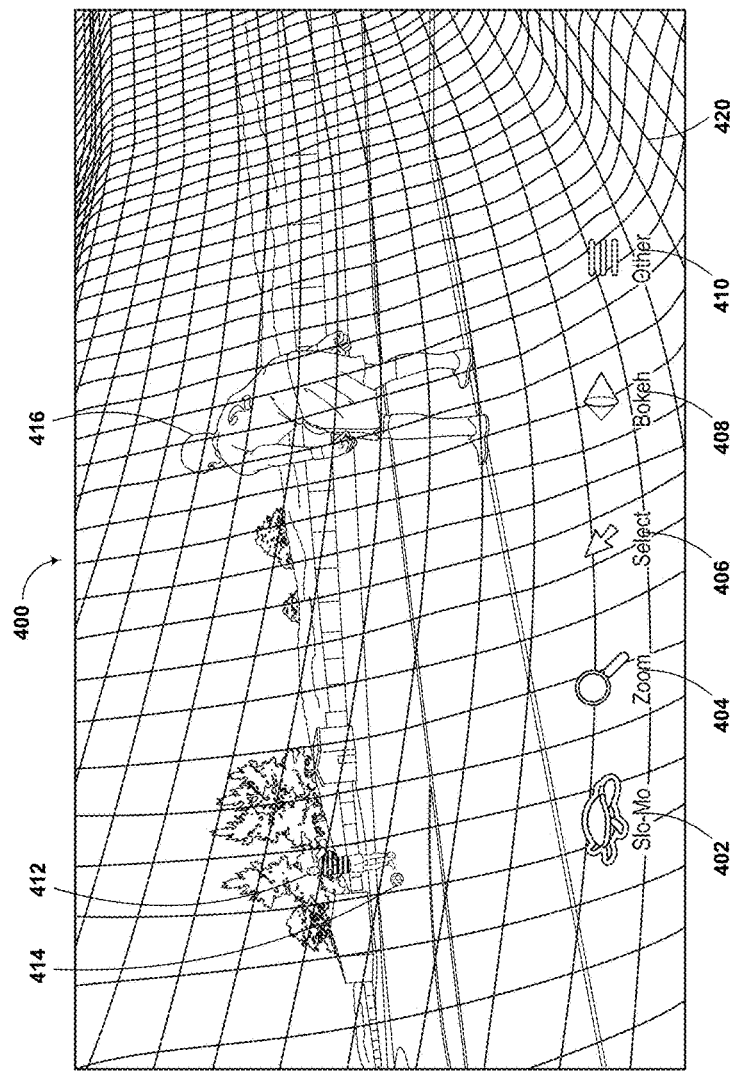
FIG. 4 depicts a scene, according to an illustrative embodiment.

Generally, systems and methods disclosed here may include the application of various effects to a live view representation viewable from a display. FIG. 4 depicts a scenario 400 according to an illustrative embodiment. Scenario 400 could include a soccer player preparing to kick a ball toward a soccer goal and goalkeeper. Scenario 400 may also represent a live-view representation viewable by a user of the HMD or another display type. As such, the live view representation may include a user interface. The user interface may include icons, words, and/or other indicators (e.g. lights and/or sounds) that may be associated with effects applicable to the live view representation. For example, the icons may include a slow motion icon 402, a zoom icon 404, a select icon 406, a bokeh icon 408, and an other icon 410. The live view representation may further include a soccer player 412, a ball 414, a goalkeeper 416, and a net 420.

User interaction via the touch-based control interface may cause an effect to be selected. Such a selection may cause the corresponding icon to be highlighted, illuminated, underlined, enlarged, or otherwise identified. For example, the slow motion icon 402 may have a lighted outline as depicted in FIG. 4.

Figure 5A:
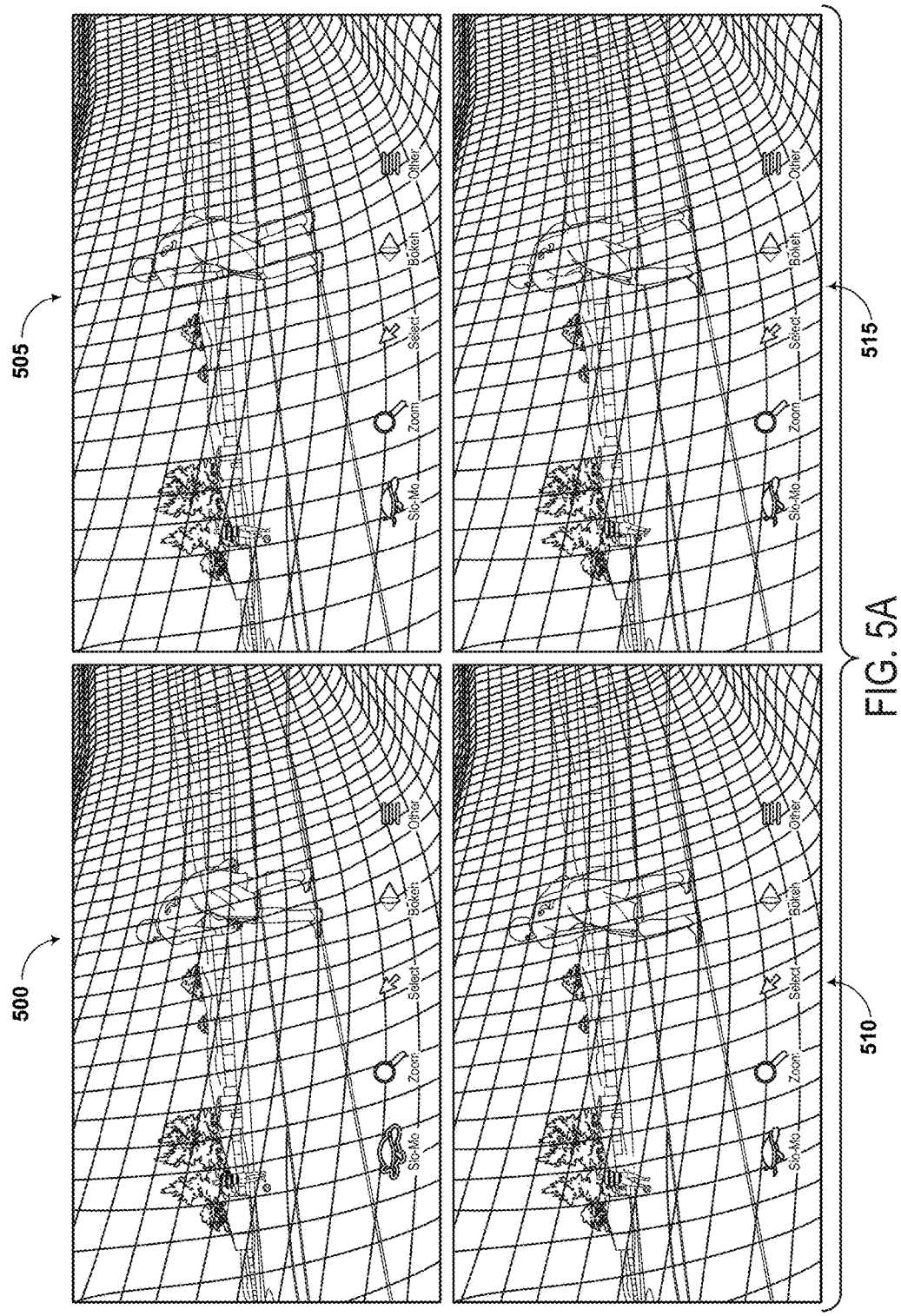
FIG. 5A depicts four scenes, according to an illustrative embodiment.

FIG. 5A depicts four successive images that occur after scenario 400. Each of the images may represent a live view representation viewable by a user via a display. For example, images 500 and 505 may depict the soccer player preparing to kick the ball toward the goalkeeper. Image 510 may include the soccer player making contact with the ball. Image 515 may include the ball in the air moving toward the goalkeeper.

Figure 5C:
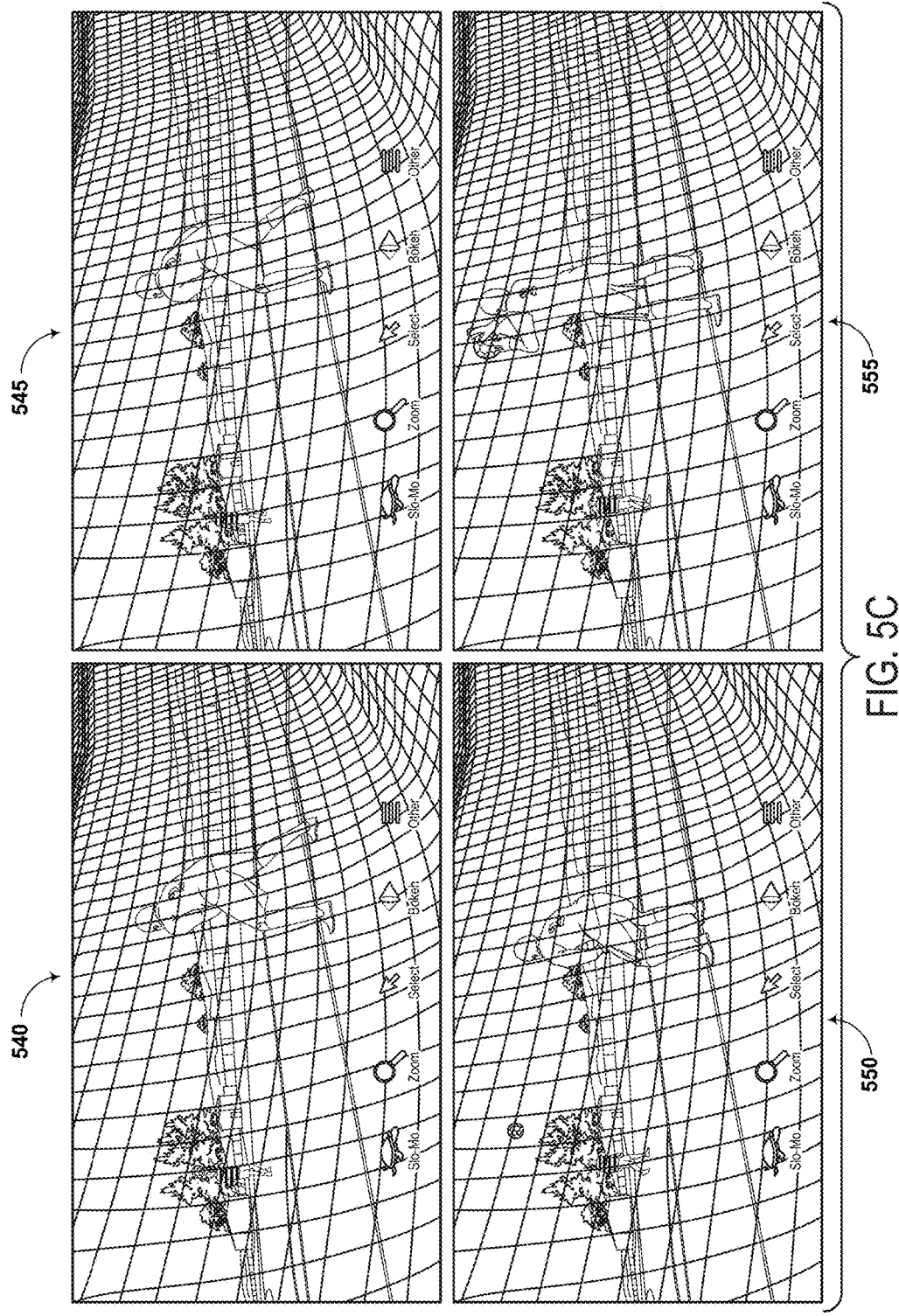
FIG. 5C depicts four scenes, according to an illustrative embodiment.

FIG. 5B depicts four successive images that occur after image 515. For example, images 520, 525, 530, and 535 may depict the ball moving closer to the goalkeeper. FIG. 5C depicts four successive images that occur after image 535. Images 540, 545, and 550 may depict the ball moving yet closer to the goalkeeper. Image 555 may include the goalkeeper making a save on the ball with his/her hands.

Although FIGS. 5A-C depict twelve images, more or less images may be captured by the system over the representative time frame. For example, images may be captured (and possibly displayed via the display) at 250 Hz or at another frequency.

If the slow motion mode is activated, for instance in response to a user interaction via the touch-based control interface, the live view representation may include images from FIGS. 5A-C. However, the displayed images may appear "slower" than compared to the real time scene. For example, if the images from FIGS. 5A-C were initially captured 100 milliseconds apart, the live view representation viewable by a user may display the representative images with 200 milliseconds between representative images. The live view representation may thus appear to a user as though the ball is moving more slowly toward the goalkeeper. In some embodiments, the live view representation may include other actual captured frames or interpolated frames so as to make the slow motion sequence appear more smoothly.

In response to a user interaction via the touch-based control interface, the slow motion effect may stop immediately, returning the live view representation to real time, or the live view representation may transition from slow motion to real time. For instance, a user may release his/her finger from the touch-based control interface. In response, the live view representation may "speed up" in order to catch up with the real time scene.

For example, a user may touch the touch-based control interface so as to start the slow motion effect. The live view representation may be displayed to the user as a "slowed down" version of the real world. The user may subsequently stop touching the touch-based control interface. In response, the live view representation may display images at a higher rate than the original capture rate so as to "catch up" the live view representation with the real time scene.

As an alternative way to control the slow-motion effect, a user finger position may be changed on the touch-sensitive surface so as to adjust the speed of the live-view representation. In other words, if for example a user moves her finger upward, the live-view representation may speed up to actual speed or even faster than actual speed. Alternatively, if a user moves her finger down on the touchpad, the live-view representation may slow down further. Other user interactions are possible so as to control the slow-motion effect via the touch-based control interface.

Figure 6:
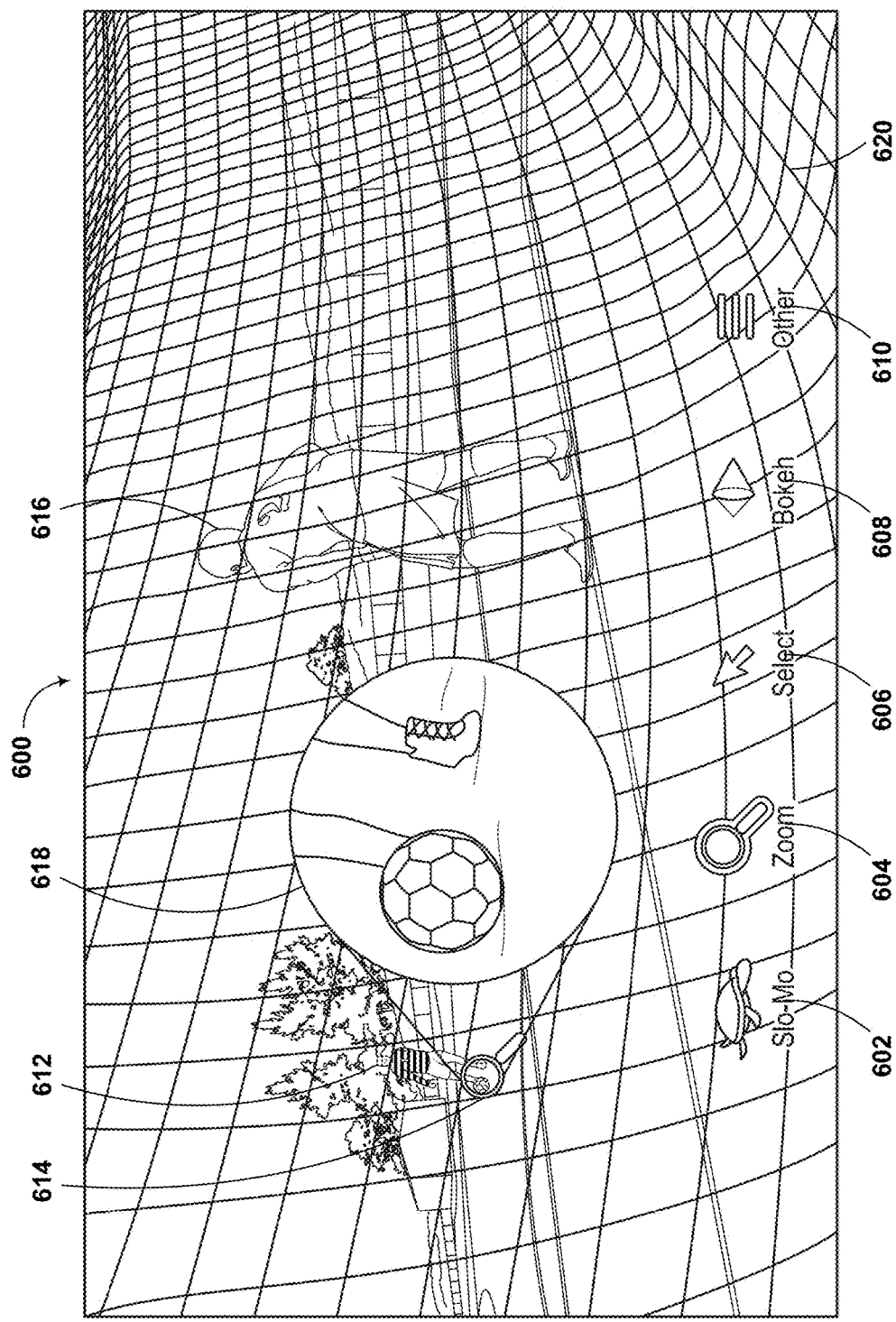
FIG. 6 depicts a scene, according to an illustrative embodiment.

Another effect applicable to the live view representation may include a magnification of a scene or a portion of a scene. FIG. 6 depicts scenario 600 according to an illustrative embodiment. Scenario 600 may represent the live view representation viewable by a user via a display. The live view representation may include a user interface. The user interface may include icons or other indicators associated with effects that may be applied to the live view representation. For example, the icons may include a slow motion icon 602, a zoom icon 604, a select icon 606, a bokeh icon 608, and an other icon 610. The live view representation may further include a soccer player 612, a ball 614, a goalkeeper 616, and a net 620.

A user may interact with the touch-based control interface to initiate the magnification mode. For example, the user may touch the touch-based control interface at a location corresponding to the magnification icon. Other user interactions to initiate the magnification mode are possible. In response to initiating magnification mode, the magnification icon 602 may be illuminated, highlighted, underlined, or otherwise specifically identified on the live view representation.

While in magnification mode, the live view representation, or a portion of the live view representation may appear magnified. The user may specify a portion of the live view representation to be magnified. For example, the user may push on the touch-based control interface at a location corresponding to the ball 614 on the live view representation. In response, a magnification inset 608 may appear. The magnification inset 608 may include a magnified view of the area near the portion of the live view representation specified by the user. As shown in FIG. 6, the soccer player's feet and the ball 614 may appear magnified within the magnified inset 608.

The user may interact further with the touch-based control interface to further control the magnification mode. For example, the user may push harder on a button or touch-sensitive surface so as to magnify the magnified areas further, while pushing less hard on the button or touch-sensitive surface may magnify those areas to a lesser extent.

The slow motion modes and magnification modes may be initiated simultaneously. That is, a user may initiate slow motion and magnification modes at the same time via the touch-based control interface. Alternatively, the slow motion mode and magnification modes may be initiated at different times, but the modes may be both applied to the live view representation concurrently. For instance, the user may initiate slow motion mode, and while the live view representation is "slowed down", the user may subsequently initiate magnification mode to "zoom into" the soccer ball or other portions of the live view representation. Other combinations of the slow motion and magnification modes are possible.

Figure 7:
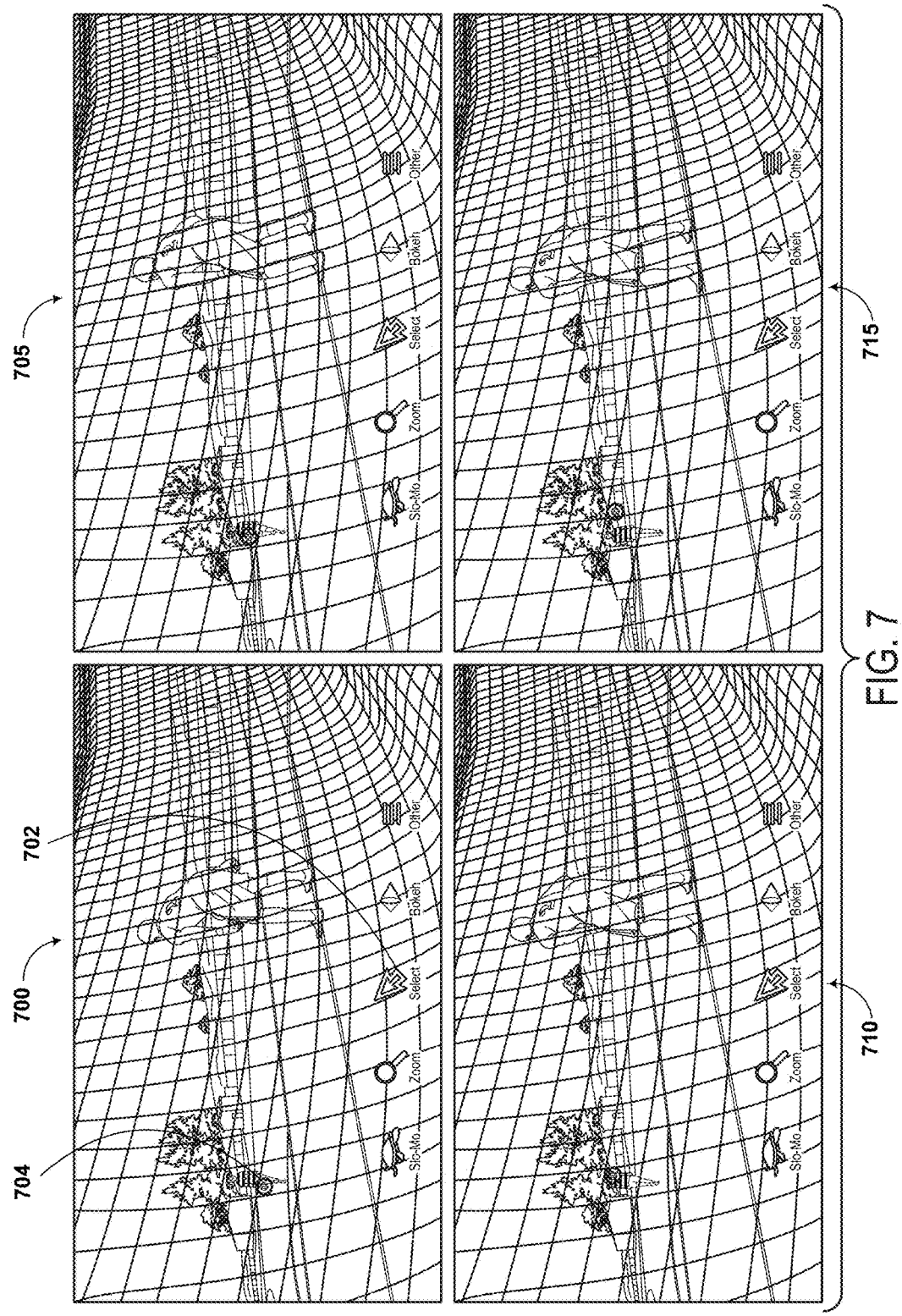
FIG. 7 depicts four scenes, according to an illustrative embodiment.

Another effect applicable to the live view representation may include an object or area selection effect. FIG. 7 depicts four successive images 700, 705, 710, and 715 based on scenario 500. A user may initiate the object or area selection effect, for example by touching the touch-based control interface. In response, the user interface may change by highlighting, underlining, illuminating, or otherwise specifically identifying the select icon 702. Further, the user interface may highlight, underline, illuminate, recolor, fill, or otherwise specifically identify the object or area selected by the user. Generally, the selection mode may change the live view representation make it easier to identify or track the selected object or area. With regard to FIG. 7, the ball 704 may be circled so as to make it easier to follow as it moves through the air toward the goal keeper.

In some embodiments, the slow motion effect may be combined with the object or area selection effect. For example, upon pressing the touch-based control interface, a slow-motion effect may be initiated on the live view representation, which may slow down fast-moving objects or individuals. The user may then move his/her finger on the touch-based control interface to cause a selection box to move around on the live-view representation. Once the selection box is moved to "select" the desired object or individual, the user may release the button, the live-view representation may return to real time and the selection box may persist, tracking the desired object or individual.

Figure 8:
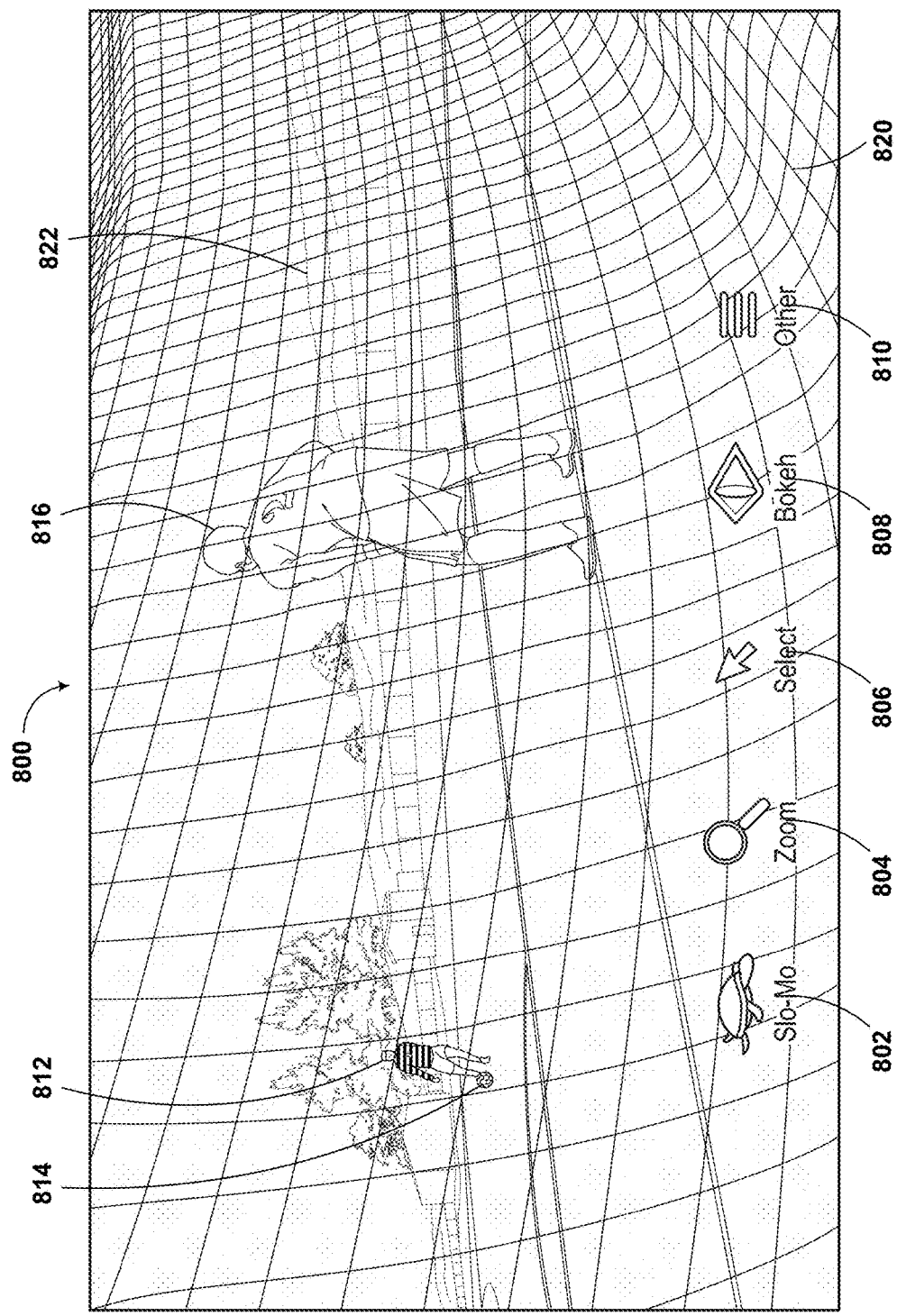
FIG. 8 depicts a scene, according to an illustrative embodiment.

In alternative embodiment, a background/foreground defocus effect may be utilized. FIG. 8 depicts an illustrative embodiment that includes scenario 800. Scenario 800 may represent a live view representation similar to that of scenario 400, as illustrated and described in reference to FIG. 4. Scenario 800 may include user interface elements, including various icons, such as a slow motion icon 802, a zoom icon 804, a select icon 806, a bokeh icon 808, and an other icon 810. The live view representation may also include a soccer player 812, a ball 814, a goalkeeper 816, a net 820, and background scenery 822.

A user may initiate a background/foreground defocus effect by, for example, interacting with the touch-based control interface. In response, the user interface may cause the bokeh icon 808 to be illuminated or otherwise highlighted. Further, in response, the user interface may apply a narrow depth of field effect to the live view representation of the scenario 800. The narrow depth of field effect may appear via the live view representation similar to a an image captured by a single lens reflex camera with a wide aperture lens. In other words, soccer player 812 and the ball 814 may be in focus, however elements of the live view representation in the foreground (e.g. net 820 and goalkeeper 816) or in the background (background scenery 822) may appear out of focus.

The background/foreground defocusing or blurring effect, also called bokeh, may be controllable based on, for instance, a user finger position on the touch-sensitive surface. The elements in or out of focus may depend on a user interaction. For example, the user may interact with the touch-based control interface to initiate bokeh mode. Subsequent user interactions (e.g. moving finger up, down, left, or right on touch-based control interface) may change the focus depth and/or the apparent depth of field on the live view representation. Other ways of controlling the degree of the effect on the live-view representation are possible.

In some embodiments, a face substitution effect may be applied to the live-view representation. In such a scenario, a user may be able to initiate a "face swap" of a person in his/her field of view and then change the face based on the user finger position on the touch-sensitive surface. The substituted face may track the person's body so as to appear like the substituted face is a part of the person's body. The substitution of other body parts, such as noses, mouths, eyes, etc. are contemplated as well. Further, the substitution of entire bodies or other objects is considered within the scope of the disclosure.

Figure 9:
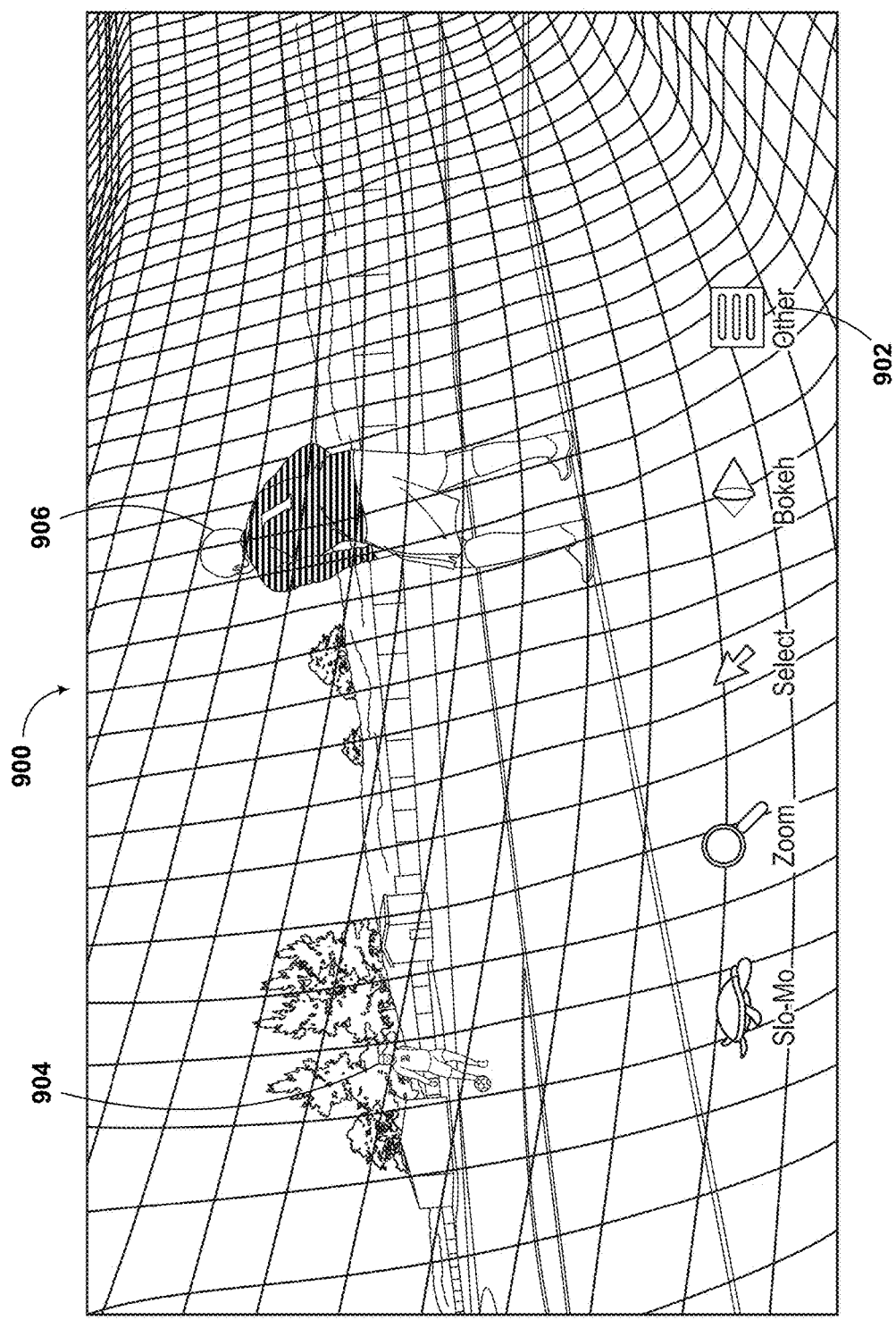
FIG. 9 depicts a scene, according to an illustrative embodiment.

FIG. 9 depicts an illustrative embodiment as shown by scenario 900. Scenario 900 may represent a live view representation viewable by a user via a display. Scenario 900 may include a user interface, which may further include effects icons, such as an other icon 902. A user may initiate a "jersey swap" effect by, for example, interacting with a touch-based control interface. In response, the user interface may highlight, illuminate, underline, or otherwise specifically identify the other icon 902 or any other icon associated with the initiated effect. In scenario 900, the other icon 902 may represent a "jersey swap" effect. As such, once "jersey swap" mode is initiated by the user, the live view representation may be adjusted such that soccer player 904 and goalkeeper 906 appear to have the opposing team's jersey. Other "swap" effects or replacement effects are considered within the scope of this disclosure.

Another effect applicable to the live view representation may include color enhancement/shifting. For example, a user may be color blind. In such a scenario, a color shifting effect may be applied to change green objects in the environment so that they appear to the user as a different color in the live-view representation. Other colors, or ranges of colors, in the environment may be shifted to appear as a different color or different color range in the live-view representation. In another example, color saturation may be increased in response to changes in color in the environment. For instance, a medical-practitioner user may wish to observe an individual's circulation near the skin surface. By applying the color saturation effect, very slight color changes may be enhanced to appear as more substantial color changes in the live-view representation.

High Dynamic Range, or HDR, may be applied to the live view representation as a further effect. For example, while in HDR mode, the dynamic range of the live-view representation may appear more compressed than normal. The user may be able to control the degree of HDR compression by moving his/her finger on the touch-sensitive surface or changing pressure on the button. Other related effects, such as brightness and contrast enhancement are possible.

In some embodiments, sensors configured to image various spectral bands may be utilized as an effect on the live view representation. For instance, in an IR/RGB mode, the user may be able to initiate and adjust a live-view representation wherein an infrared image and an RGB image of the field of view are combined in a single, real-time, display. Other spectral bands are possible. For example, UV/RGB, UV/X-ray, etc.

In another embodiment, alternate viewing modes may represent one or more effects. For example, a cat-vision effect may be controlled by a user that may allow a user to observe the environment similar to a cat. Other animal (e.g. dog, fish, bird, etc.) vision modes are contemplated within the scope of this disclosure.

In yet another embodiment, a multispectral imaging effect may be applied to the live-view representation. For example, a false color map may be used so that a user could observe a representation of light outside the visible spectrum. Other substitution maps are possible. For example, a symbolic (e.g. cross-hatching) map may be used.

In a further embodiment, a "kid-mode" effect may be utilized to assist with or teach photographic technique. For example, a user may initiate kid mode by touching a touch-sensitive surface. The imaging subsystem 320, or camera, may be provided to a child or someone learning about photography. The child and/or the person learning about photography might wave the camera around in an arbitrary manner. The imaging subsystem may detect that a suitable subject is properly composed within the field of view and trigger a still image or video clip to be recorded.

III. Illustrative Methods

Figure 10:
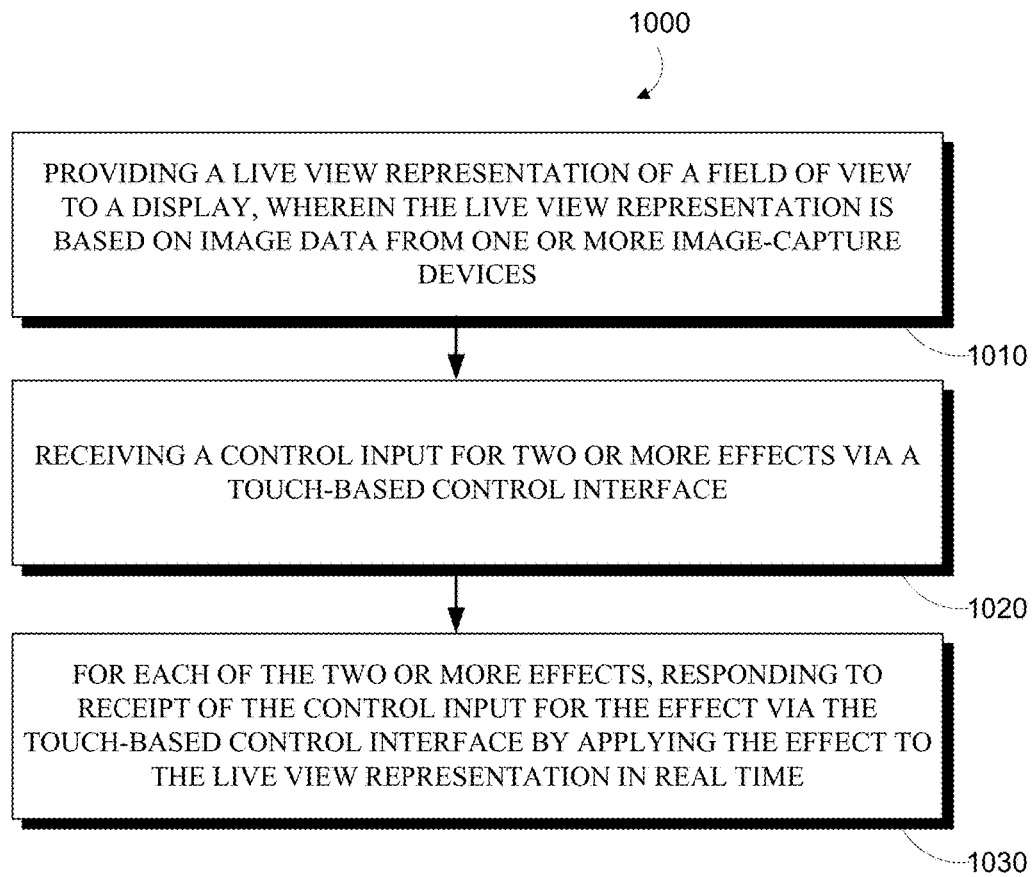
FIG. 10 is a flowchart of an example method, according to an illustrative embodiment.

FIG. 10 is a flowchart of a method 1000 for providing a live-view representation of image data from one or more image-capture devices and applying two or more effects to the live-view representation, where the effects are controllable in real time via a touch-based control interface. Method 1000 could be carried out with the systems described and illustrated in FIGS. 1A-9. Blocks need not be carried out in the order presented. Other systems and steps may be utilized to carry out method 1000. Block 1010 includes providing a live view representation of a field of view to a display. The live view representation is based on image data from one or more image-capture devices. Block 1020 includes receiving a control input for two or more effects via a touch-based control interface. Block 1030 includes for each of the two or more effects, responding to receipt of the control input for the effect via the touch-based control interface by applying the effect to the live view representation in real time. The two or more effects may include, but are not limited to, the effects described above.

IV. Illustrative Non-Transitive Computer Readable Medium

Some or all of the functions described above and illustrated in FIG. 10 may be performed by a computing device in response to the execution of instructions stored in a non-transitory computer readable medium. The non-transitory computer readable medium may be, for example, a random access memory (RAM), a read-only memory (ROM), a flash memory, a cache memory, one or more magnetically encoded discs, one or more optically encoded discs, or any other form of non-transitory data storage. The non-transitory computer readable medium may also be distributed among multiple data storage elements, which may be remotely located from each other. The non-transitory computer readable medium could be the computer readable medium 360 as described and illustrated in FIG. 3. The computing device that executes the stored instructions may include the computational subsystem 350 as described and illustrated in FIG. 3. Additionally or alternatively, the computing device may include another computing device, such as a server in a server network.

The non-transitory computer readable medium may store instructions executable by a computing device (e.g. computational subsystem 350 as described in reference to FIG. 3) to cause the computing device to perform any of the functions described herein. The functions may take the form of program instructions 370 as described and illustrated in FIG. 3.

In one example, the functions include causing a live view representation of a field of view to be provided to a display. The live view representation is based on image data from one or more image-capture devices. The functions further include receiving a control input for two or more effects via a touch-based control interface. The functions yet further include, for each of the two or more effects, responding to receipt of the control input for the effect via the touch-based control interface by causing the effect to be applied to the live view representation in real time.

V. Conclusion

Where example embodiments involve information related to a person or a device of a person, some embodiments may include privacy controls. Such privacy controls may include, at least, anonymization of device identifiers, transparency and user controls, including functionality that would enable users to modify or delete information relating to the user's use of a product.

Further, in situations where embodiments discussed herein collect personal information about users, or may make use of personal information, the users may be provided with an opportunity to control whether programs or features collect user information (e.g., information about a user's medical history, social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined. Thus, the user may have control over how information is collected about the user and used by a content server.

The particular arrangements shown in the Figures should not be viewed as limiting. It should be understood that other embodiments may include more or less of each element shown in a given Figure. Further, some of the illustrated elements may be combined or omitted. Yet further, an illustrative embodiment may include elements that are not illustrated in the Figures.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims.

The invention claimed is:

1. A system comprising:
a mobile computing device, wherein the mobile computing device comprises:
one or more image-capture devices;
a display, wherein the display is configured to display a live view representation of a field of view based on image data from the one or more image-capture devices; and
a touch-based control interface; and
a control system configured to:
generate the live view representation of the field of view based on image data from the one or more image-capture devices;
display, in the live view representation of the field of view, computer-generated graphics comprising a plurality of icons, wherein each icon of the plurality of icons is representative of a corresponding effect;
receive, via the touch-based control interface, control input indicative of a selection of a first icon from the plurality of icons;
in response to receiving control input indicative of the selection of the first icon, produce, in the live view representation in real-time, a first effect that corresponds to the selected first icon;
receive, via the touch-based control interface, control input indicative of a selection of a second icon from the plurality of icons;
in response to receiving control input indicative of the selection of the second icon, produce, in the live view representation in real-time, a second effect that corresponds to the selected second icon, wherein the first and second effects are produced concurrently in the live view representation in real-time;
receive, via the touch-based control interface, control input indicative of a first adjustment to the first effect being produced, wherein the first adjustment is based on a first variation of touch on the touch-based control interface;
in response to receiving control input indicative of the first adjustment, adjust, in accordance with the first adjustment that is based on the first variation of touch on the touch-based control interface, the first effect being produced;
receive, via the touch-based control interface, control input indicative of a second adjustment to the second effect being produced, wherein the second adjustment is based on a second variation of touch on the touch-based control interface, and wherein the second variation of touch is different from the first variation of touch; and
in response to receiving control input indicative of the second adjustment, adjust, in accordance with the second adjustment that is based on the second variation of touch on the touch-based control interface, the second effect being produced.

2. The system of claim 1, wherein the one or more image-capture devices comprises a sensor configured to capture images of the field of view.

3. The system of claim 2, wherein the sensor is configured to capture images of the field of view based on visible light.

4. The system of claim 2, wherein the sensor is configured to capture images of the field of view based on infrared light.

5. The system of claim 1, wherein the touch-based control interface comprises one or more of the following: (i) a touch-sensitive surface and (ii) a button.

6. The system of claim 1, wherein the first effect comprises one of the following effects: (i) a slow-motion effect, (ii) a speed-up effect, (iii) a bokeh effect, and (iv) a high dynamic range effect.

7. The system of claim 1, wherein the control system being configured to produce the first effect comprises the control system being configured to produce the first effect while receiving, via the touch-based control interface, control input associated with the first effect, and wherein the control system is further configured to:
detect that control input associated with the first effect is no longer being received via the touch-based control interface; and
in response to detecting that control input associated with the first effect is no longer being received via the touch-based control interface, stop producing, in the live view representation in real-time, the first effect that corresponds to the selected first icon.

8. The system of claim 1, wherein the control system is further configured to:
receive, via the touch-based control interface, control input indicative of a further adjustment to the first effect; and
in response to receiving control input indicative of the further adjustment to the first effect, adjust the first effect in accordance with the further adjustment and with respect to the second effect.

9. The system of claim 1, wherein the first effect comprises a hyperspectral effect and the second effect comprises a slow-motion effect, a speed-up effect, a bokeh effect, or a high dynamic range effect.

10. A method comprising:
capturing a live view representation of a field of view based on image data from one or more image-capture devices of a mobile computing device;

providing the live view representation from the one or more image-capture devices to a display of the mobile computing device;

displaying, in the live view representation of the field of view, computer-generated graphics comprising a plurality of icons, wherein each icon of the plurality of icons is representative of a corresponding effect;

receiving via a touch-based control interface of the mobile computing device, control input indicative of a selection of a first icon from the plurality of icons;

in response to receiving control input indicative of the selection of the first icon, producing, in the live view representation in real-time, a first effect that corresponds to the selected first icon;

receiving, via the touch-based control interface, control input indicative of a selection of a second icon from the plurality of icons;

in response to receiving control input indicative of the selection of the second icon, producing, in the live view representation in real-time, a second effect that corresponds to the selected second icon, wherein the first and second effects are produced concurrently in the live view representation in real-time;

receiving, via the touch-based control interface, control input indicative of a first adjustment to the first effect being produced, wherein the first adjustment is based on a first variation of touch on the touch-based control interface;

in response to receiving control input indicative of the first adjustment, adjusting, in accordance with the first adjustment that is based on the first variation of touch on the touch-based control interface, the first effect being produced;

receiving, via the touch-based control interface, control input indicative of a second adjustment to the second effect being produced, wherein the second adjustment is based on a second variation of touch on the touch-based control interface, and wherein the second variation of touch is different from the first variation of touch; and in response to receiving control input indicative of the second adjustment, adjusting, in accordance with the second adjustment that is based on the second variation of touch on the touch-based control interface, the second effect being produced.

11. The method of claim 10, wherein producing the first effect comprises producing the first effect while receiving, via the touch-based control interface, control input associated with the first effect, the method further comprising:

detecting that control input associated with the first effect is no longer being received via the touch-based control interface; and in response to detecting that control input associated with the first effect is no longer being received via the touch-based control interface, stopping to produce, in the live view representation in real-time, the first effect that corresponds to the selected first icon.

12. The method of claim 10, further comprising:

receiving, via the touch-based control interface, control input indicative of a further adjustment to the first effect; and in response to receiving control input indicative of the further adjustment to the first effect, adjusting the first effect in accordance with the further adjustment and with respect to the second effect.

13. A non-transitory computer readable medium having stored therein instructions executable by a mobile computing device to cause the mobile computing device to perform functions comprising:

generating a live view representation of a field of view based on image data from one or more image-capture devices of the mobile computing device;

causing the live view representation to be provided to a display of the mobile computing device;

displaying, in the live view representation of the field of view, computer-generated graphics comprising a plurality of icons, wherein each icon of the plurality of icons is representative of a corresponding effect;

receiving, via a touch-based control interface of the mobile computing device, control input indicative of a selection of a first icon from the plurality of icons;

in response to receiving control input indicative of the selection of the first icon, producing, in the live view representation in real-time, a first effect that corresponds to the selected first icon;

receiving, via the touch-based control interface, control input indicative of a selection of a second icon from the plurality of icons;

in response to receiving control input indicative of the selection of the second icon, producing, in the live view representation in real-time, a second effect that corresponds to the selected second icon, wherein the first and second effects are produced concurrently in the live view representation in real-time;

receiving, via the touch-based control interface, control input indicative of a first adjustment to the first effect being produced, wherein the first adjustment is based on a first variation of touch on the touch-based control interface;

in response to receiving control input indicative of the first adjustment, adjusting, in accordance with the first adjustment that is based on the first variation of touch on the touch-based control interface, the first effect being produced;

receiving, via the touch-based control interface, control input indicative of a second adjustment to the second effect being produced, wherein the second adjustment is based on a second variation of touch on the touch-based control interface, and wherein the second variation of touch is different from the first variation of touch; and in response to receiving control input indicative of the second adjustment, adjusting, in accordance with the second adjustment that is based on the second variation of touch on the touch-based control interface, the second effect being produced.

* * * * *